(12) United States Patent
Muto et al.

(10) Patent No.: US 11,397,133 B2
(45) Date of Patent: *Jul. 26, 2022

(54) MISFIRE DETECTION DEVICE FOR INTERNAL COMBUSTION ENGINE, MISFIRE DETECTION SYSTEM FOR INTERNAL COMBUSTION ENGINE, DATA ANALYSIS DEVICE, AND CONTROLLER FOR INTERNAL COMBUSTION ENGINE

(71) Applicant: TOYOTA JIDOSHA KABUSHIKI KAISHA, Toyota (JP)

(72) Inventors: Harufumi Muto, Miyoshi (JP); Satoshi Takamoto, Miyoshi (JP); Akihiro Katayama, Toyota (JP); Tatsunobu Murai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,380

(22) Filed: Jul. 9, 2021

(65) Prior Publication Data

US 2021/0333170 A1 Oct. 28, 2021

Related U.S. Application Data

(63) Continuation of application No. 16/785,705, filed on Feb. 10, 2020, now Pat. No. 11,099,102.

(30) Foreign Application Priority Data

Feb. 15, 2019 (JP) .............................. JP2019-025553

(51) Int. Cl.
*G01M 15/11* (2006.01)
*F02D 41/00* (2006.01)
(Continued)

(52) U.S. Cl.
CPC ......... *G01M 15/11* (2013.01); *F02D 41/0097* (2013.01); *F02D 41/1405* (2013.01);
(Continued)

(58) Field of Classification Search
CPC ..................................................... G01M 15/11
See application file for complete search history.

(56) References Cited

U.S. PATENT DOCUMENTS 4,092,955 A 6/1978 Reddy
4,213,181 A 7/1980 Carp
(Continued)

FOREIGN PATENT DOCUMENTS

EP 2 123 891 A1 11/2009
JP 1-301946 A 12/1989
(Continued)

OTHER PUBLICATIONS

Office Action issued in U.S. Appl. No. 16/785,705 dated Oct. 26, 2020.
(Continued)

*Primary Examiner* — Kevin R Steckbauer
(74) *Attorney, Agent, or Firm* — Oblon, McClelland, Maier & Neustadt, L.L.P.

(57) ABSTRACT

A misfire detection device for an internal combustion engine is provided. A mapping takes time series data of instantaneous speed parameters as inputs. Each instantaneous speed parameter corresponds to one of a plurality of successive second intervals in a first interval. The instantaneous speed parameters correspond to the rotational speed of the crankshaft. The first interval is a rotational angular interval of the crankshaft in which compression top dead center occurs. The second interval is smaller than an interval between compression top dead center positions. The mapping outputs a probability that a misfire has occurred in at least one
(Continued)

cylinder that reaches compression top dead center in the first interval. The mapping data defining the mapping has been learned by machine learning.

3 Claims, 15 Drawing Sheets

(51) Int. Cl.
*F02D 41/22* (2006.01)
*F02D 41/24* (2006.01)
*G01L 3/00* (2006.01)
*G01M 15/06* (2006.01)
*F02D 41/14* (2006.01)

(52) U.S. Cl.
CPC ..... *F02D 41/1497* (2013.01); *F02D 41/1498* (2013.01); *F02D 41/22* (2013.01); *F02D 41/2438* (2013.01); *F02D 41/2451* (2013.01); *G01L 3/00* (2013.01); *G01M 15/06* (2013.01); *F02D 2200/101* (2013.01); *F02D 2200/1002* (2013.01); *F02D 2200/1015* (2013.01)

(56) References Cited

U.S. PATENT DOCUMENTS

| | | | |
|---|---|---|---|
| 5,044,194 A * | 9/1991 | James | G01M 15/042 73/114.15 |
| 5,044,195 A * | 9/1991 | James | G01M 15/11 73/114.05 |
| 5,093,792 A | 3/1992 | Taki | |
| 5,095,742 A * | 3/1992 | James | F02D 41/1497 73/114.24 |
| 5,109,695 A * | 5/1992 | James | G01M 15/11 73/114.05 |
| 5,222,392 A * | 6/1993 | Baba | G01M 15/11 73/114.03 |
| 5,237,862 A * | 8/1993 | Mangrulkar | G01M 15/11 73/114.04 |
| 5,303,158 A * | 4/1994 | Kuroda | G01M 15/11 701/111 |
| 5,353,634 A * | 10/1994 | Baba | G01M 15/11 73/114.04 |
| 5,442,955 A * | 8/1995 | Baba | G01M 15/11 340/439 |
| 5,493,901 A * | 2/1996 | Kuroda | G01M 15/11 123/436 |
| 5,495,415 A * | 2/1996 | Ribbens | G01M 15/11 123/436 |
| 5,539,644 A | 7/1996 | Ichikawa | |
| 5,576,963 A | 11/1996 | Ribbens | |
| 5,587,909 A * | 12/1996 | Matsumoto | G01L 19/147 701/111 |
| 5,625,143 A * | 4/1997 | Kadota | G01M 15/11 324/392 |
| 5,638,278 A * | 6/1997 | Nishimura | G01M 15/11 123/436 |
| 5,687,692 A | 11/1997 | Togai | |
| 5,915,359 A | 6/1999 | Meyer | |
| 6,021,369 A | 2/2000 | Kamihira | |
| 6,032,139 A | 2/2000 | Yamaguchi | |
| 6,064,996 A | 5/2000 | Yamaguchi | |
| 6,098,012 A | 8/2000 | Stander | |
| 6,131,444 A * | 10/2000 | Wu | G01M 15/11 73/114.02 |
| 6,151,548 A | 11/2000 | Kamihira | |
| 6,199,057 B1 | 3/2001 | Tawel | |
| 6,240,343 B1 | 5/2001 | Sarangapani | |
| 6,272,426 B1 | 8/2001 | Tascillo | |
| 6,278,986 B1 | 8/2001 | Kamihira | |
| 6,289,275 B1 | 9/2001 | Stander | |
| 6,292,738 B1 * | 9/2001 | Feldkamp | G01M 15/11 701/111 |
| 6,304,862 B1 | 10/2001 | Yamaguchi | |
| 6,324,529 B1 | 11/2001 | Kamihira | |
| 6,324,530 B1 | 11/2001 | Yamaguchi | |
| 6,397,113 B1 | 5/2002 | Kamihira | |
| 6,434,541 B1 | 8/2002 | Tawel | |
| 6,529,816 B1 | 3/2003 | Yamaguchi | |
| 6,721,647 B1 | 4/2004 | Kita | |
| 6,851,302 B2 * | 2/2005 | Hashiguchi | G01M 15/11 73/114.02 |
| 6,935,313 B2 | 8/2005 | Jacobson | |
| 6,978,666 B1 * | 12/2005 | Wu | G01M 15/11 73/114.02 |
| 7,062,333 B2 | 6/2006 | Mizutani | |
| 7,113,861 B2 | 9/2006 | Jacobson | |
| 7,181,334 B2 * | 2/2007 | Kropinski | G05B 23/024 701/114 |
| 7,266,439 B2 | 9/2007 | Wang | |
| 7,386,389 B2 | 6/2008 | Stolle | |
| 7,440,839 B2 | 10/2008 | Cesario | |
| 7,530,261 B2 * | 5/2009 | Walters | G01M 15/11 73/114.04 |
| 7,536,902 B2 * | 5/2009 | Tsukamoto | G01M 15/11 73/114.04 |
| 7,680,751 B2 | 3/2010 | Parthasarathy | |
| 7,774,127 B2 | 8/2010 | Prunier | |
| 7,881,855 B2 | 2/2011 | Damitz | |
| 7,962,272 B2 | 6/2011 | Cesario | |
| 8,091,410 B2 * | 1/2012 | Malaczynski | G01M 15/11 73/114.04 |
| 8,131,450 B2 | 3/2012 | Cesario | |
| 8,281,650 B2 * | 10/2012 | Kushihama | G01M 15/11 73/114.04 |
| 8,762,307 B2 | 6/2014 | Hashimoto | |
| 8,991,367 B2 * | 3/2015 | Sano | F02D 41/0072 123/568.21 |
| 10,167,800 B1 * | 1/2019 | Chung | G05B 23/0254 |
| 10,196,997 B2 | 2/2019 | Merlino | |
| 10,309,872 B2 * | 6/2019 | Hyodo | F02D 41/2403 |
| 10,605,179 B2 * | 3/2020 | Charbonnel | G01M 15/08 |
| 10,663,373 B2 * | 5/2020 | Miura | F02D 17/02 |
| 10,696,298 B2 | 6/2020 | Movert | |
| 10,816,438 B2 * | 10/2020 | Chen | F02D 41/0087 |
| 10,844,803 B2 * | 11/2020 | Muto | F02D 41/1495 |
| 10,853,727 B2 * | 12/2020 | Kitagawa | G05B 13/024 |
| 10,876,500 B2 * | 12/2020 | Kitagawa | F02M 26/09 |
| 10,969,304 B2 * | 4/2021 | Hashimoto | F02D 41/1498 |
| 11,047,326 B2 * | 6/2021 | Anzawa | F02D 13/0223 |
| 11,053,880 B1 * | 7/2021 | Yamada | F02D 13/0219 |
| 11,092,103 B2 * | 8/2021 | Hashimoto | F02D 41/22 |
| 11,111,869 B2 * | 9/2021 | Hashimoto | F02N 11/04 |
| 11,125,175 B2 * | 9/2021 | Chen | F02B 9/04 |
| 11,125,178 B2 * | 9/2021 | Hashimoto | F02D 29/02 |
| 2003/0051538 A1 * | 3/2003 | Hashiguchi | G01M 15/11 73/114.26 |
| 2003/0163242 A1 | 8/2003 | Miyauchi | |
| 2003/0216853 A1 | 11/2003 | Jacobson | |
| 2004/0078095 A1 | 4/2004 | Mizutani | |
| 2004/0230368 A1 * | 11/2004 | Kropinski | G05B 9/02 701/114 |
| 2005/0187700 A1 | 8/2005 | Jacobson | |
| 2006/0080025 A1 | 4/2006 | Wang | |
| 2006/0212209 A1 | 9/2006 | Cesario | |
| 2006/0271269 A1 | 11/2006 | Stolle | |
| 2007/0157713 A1 * | 7/2007 | Tsukamoto | G01M 15/11 73/114.04 |
| 2008/0190184 A1 * | 8/2008 | Walters | G01M 15/11 73/114.02 |
| 2009/0005953 A1 | 1/2009 | Cesario | |
| 2009/0018752 A1 | 1/2009 | Prunier | |
| 2009/0088956 A1 * | 4/2009 | Lin | B60Q 9/00 701/111 |
| 2009/0301430 A1 | 12/2009 | Damitz | |
| 2010/0031736 A1 * | 2/2010 | Kushihama | G01M 15/11 73/114.04 |
| 2010/0294027 A1 | 11/2010 | Kondo | |
| 2011/0072893 A1 * | 3/2011 | Malaczynski | G01M 15/11 73/114.03 |
| 2011/0093182 A1 | 4/2011 | Weber | |

(56) References Cited

U.S. PATENT DOCUMENTS

| | | |
|---|---|---|
| 2011/0218727 A1 | 9/2011 | Cesario |
| 2012/0117011 A1 | 5/2012 | Hashimoto |
| 2012/0245791 A1 | 9/2012 | Yun |
| 2013/0133632 A1* | 5/2013 | Sano ............... F02D 41/0072 123/568.11 |
| 2015/0192498 A1* | 7/2015 | Takahashi ............. G01M 15/11 73/114.04 |
| 2016/0299035 A1 | 10/2016 | Choi |
| 2016/0334305 A1* | 11/2016 | Hyodo ................. G01M 15/11 |
| 2017/0184043 A1 | 6/2017 | Neuman |
| 2018/0179975 A1 | 6/2018 | Merlino |
| 2018/0340863 A1* | 11/2018 | Miura ................ F02D 41/0087 |
| 2019/0101472 A1* | 4/2019 | Wakimura ............. F02B 67/06 |
| 2019/0145859 A1* | 5/2019 | Chen .................... G06N 3/0481 701/102 |
| 2019/0176818 A1 | 6/2019 | Movert |
| 2019/0195173 A1 | 6/2019 | Kitagawa |
| 2019/0219483 A1* | 7/2019 | Asaura ................... F02D 41/22 |
| 2019/0242318 A1 | 8/2019 | Kitagawa |
| 2020/0056555 A1* | 2/2020 | Charbonnel ......... F02D 35/023 |
| 2020/0234136 A1* | 7/2020 | Kitagawa ........... G05B 23/0254 |
| 2020/0263617 A1* | 8/2020 | Hashimoto ......... F02D 41/2454 |
| 2020/0264074 A1* | 8/2020 | Hashimoto ............ G01M 15/11 |
| 2020/0300193 A1* | 9/2020 | Muto .................... F02D 41/222 |
| 2020/0309053 A1* | 10/2020 | Anzawa ............... F02D 41/068 |
| 2020/0309054 A1* | 10/2020 | Anzawa ............. F02D 41/1498 |
| 2020/0309055 A1* | 10/2020 | Anzawa ............. F02D 41/2409 |
| 2020/0378329 A1* | 12/2020 | Muto ................... F02D 41/22 |
| 2021/0003088 A1* | 1/2021 | Chen ................. F02D 41/1498 |
| 2021/0033039 A1* | 2/2021 | Hashimoto ............ G07C 5/085 |
| 2021/0033040 A1* | 2/2021 | Hashimoto ......... F02D 41/1454 |
| 2021/0053577 A1* | 2/2021 | Hashimoto ............. G06N 3/08 |
| 2021/0053578 A1* | 2/2021 | Hashimoto ............. G06N 3/08 |
| 2021/0054797 A1* | 2/2021 | Hashimoto ............ F02D 41/28 |
| 2021/0054800 A1* | 2/2021 | Hashimoto ............ F02D 41/26 |
| 2021/0056781 A1* | 2/2021 | Hashimoto .......... G07C 5/0841 |
| 2021/0062746 A1* | 3/2021 | Hashimoto ......... G01M 15/046 |
| 2021/0062747 A1* | 3/2021 | Hashimoto ......... F02D 41/1405 |
| 2021/0095610 A1* | 4/2021 | Hashimoto ......... F02D 41/1446 |
| 2021/0207553 A1* | 7/2021 | Yamada ................ F02D 41/222 |
| 2021/0222640 A1* | 7/2021 | Hashimoto ......... F02D 41/2451 |
| 2021/0222641 A1* | 7/2021 | Takamoto ........... F02D 41/1497 |
| 2021/0255061 A1* | 8/2021 | Hashimoto .......... G06K 9/6271 |

FOREIGN PATENT DOCUMENTS

| | | |
|---|---|---|
| JP | 4-91348 A | 3/1992 |
| JP | 5-86958 A | 4/1993 |
| JP | 10-252536 A | 9/1998 |
| JP | 2001-507772 A | 6/2001 |
| JP | 2004-263680 A | 9/2004 |
| JP | 2009-174397 A | 8/2009 |
| JP | 2017-155712 A | 9/2017 |
| JP | 2018-135844 A | 8/2018 |
| JP | 2018-178810 A | 11/2018 |
| JP | 2019-19755 A | 2/2019 |

OTHER PUBLICATIONS

Office Action issued in U.S. Appl. No. 16/785,705 dated Feb. 9, 2021.
Notice of Allowance issued in U.S. Appl. No. 16/785,705 dated May 3, 2021.
Corrected Notice of Allowability issued in U.S. Appl. No. 16/785,705 dated Jul. 23, 2021.
Notice of Allowance issued in U.S. Appl. No. 16/785,739 dated Nov. 25, 2020.
Supplemental Notice of Allowability issued in U.S. Appl. No. 16/785,739 dated Feb. 18, 2021.
Supplemental Notice of Allowability issued in U.S. Appl. No. 16/785,739 dated Mar. 3, 2021.
Notice of Allowance dated Oct. 6, 2021 in co-pending U.S. Appl. No. 16/785,760, 8 pages.
Extended European Search Report issued in European Patent Application No. 20155682.6 dated Jul. 8, 2020.
Extended European Search Report issued in European Patent Application No. 20155691.7 dated Jul. 14, 2020.
U.S. Office Action issued in U.S. Appl. No. 16/785,760 dated Jun. 22, 2021.

* cited by examiner

MISFIRE DETECTION DEVICE FOR INTERNAL COMBUSTION ENGINE, MISFIRE DETECTION SYSTEM FOR INTERNAL COMBUSTION ENGINE, DATA ANALYSIS DEVICE, AND CONTROLLER FOR INTERNAL COMBUSTION ENGINE

CROSS-REFERENCE TO RELATED APPLICATIONS

This application is a continuation of U.S. application Ser. No. 16/785,705 filed Feb. 10, 2020, the entire contents of which is incorporated herein by reference. U.S. application Ser. No. 16/785,705 claims the benefit of priority from prior Japanese Application No. 2019-025553 filed Feb. 15, 2019.

BACKGROUND

1. Field

The present disclosure relates to a misfire detection device for an internal combustion engine, a misfire detection system for an internal combustion engine, a data analysis device, and a controller for an internal combustion engine.

2. Description of Related Art

Japanese Laid-Open Patent Publication No. 2009-174397 describes an apparatus that measures the time required for the crankshaft to rotate by the angular interval between successive compression top dead center positions, and uses this time duration as the rotational speed of the crankshaft associated with the combustion strokes of the cylinders. This apparatus determines the presence or absence of misfires based on the difference between these durations.

A crankshaft exhibits complex rotational behavior even within each angular interval between successive compression top dead center positions. However, the conventional apparatus is incapable of identifying the rotational behavior of the crankshaft within an angular interval that is smaller than the angular interval between compression top dead center positions. The conventional apparatus thus fails to fully use the available information in determining the presence or absence of misfires.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A misfire detection device for an internal combustion engine, comprising:
  a storage device; and
  an execution device, wherein
  the storage device is configured to store mapping data that defines a mapping that takes time series data of instantaneous speed parameters as inputs to output a probability that a misfire has occurred in the internal combustion engine, each instantaneous speed parameter corresponding to one of a plurality of successive second intervals in a first interval,
  the execution device is configured to perform:
    an obtainment process that obtains the instantaneous speed parameters based on a detection value of a sensor that detects rotational behavior of a crankshaft of the internal combustion engine;
    a determination process that determines presence or absence of a misfire based on an output of the mapping, which takes the time series data as inputs; and
    a response process that, when the determination process determines that a misfire has occurred, operates predetermined hardware to respond to a situation where the misfire has occurred,
  the instantaneous speed parameters correspond to rotational speed of the crankshaft,
  the first interval is a rotational angular interval of the crankshaft in which compression top dead center occurs,
  the second interval is smaller than an interval between compression top dead center positions,
  the mapping outputs a probability that a misfire has occurred in at least one cylinder that reaches compression top dead center in the first interval, and
  the mapping data is data that has been learned by machine learning.

This configuration calculates probabilities of misfires by using a mapping that takes time series data of instantaneous speed parameters as inputs. The instantaneous speed parameter corresponds to one of a plurality of second intervals in the first interval. The rotational behavior of the crankshaft in the first interval includes information on the presence or absence of misfires in at least one cylinder, and the second interval is an angular interval smaller than the angular interval between compression top dead center positions. The mapping data contains values that have been learned by machine learning and defines the computation performed on the time series data of instantaneous speed parameters. The mapping represents learned relationships between instantaneous speed parameters and probabilities. The configuration thus determines the presence or absence of misfires using the information on the rotational behavior of the crankshaft in angular intervals that are smaller than the angular interval between compression top dead center positions.

Example 2: The misfire detection device for an internal combustion engine according to Example 1, wherein
  the inputs to the mapping include a parameter that defines an operating point of the internal combustion engine,
  the obtainment process includes obtaining the parameter that defines the operating point, and
  the determination process determines presence or absence of a misfire based on an output of the mapping that is obtained by further including, in the inputs to the mapping, the parameter that defines the operating point and is obtained in the obtainment process.

Control of the internal combustion engine often depends on the operating point of the internal combustion engine. As such, the rotational behavior of the crankshaft may vary with the operating point of the internal combustion engine. The configuration described above includes, in the inputs to the mapping, a parameter that defines the operating point of the internal combustion engine. This allows for the calculation of misfire probabilities that reflects a change in the rotational behavior of the crankshaft associated with the operating point.

Example 3: The misfire detection device for an internal combustion engine according to Example 1 or 2, wherein
  the inputs to the mapping include a moderator variable that is a parameter for controlling combustion speed of air-fuel mixture in a combustion chamber of the internal combustion engine by operating an operation portion of the internal combustion engine, the obtainment process includes obtaining the moderator variable, and the determination process determines presence or absence of a misfire based on an output of the mapping that is obtained by further including, in the inputs to the mapping, the moderator variable that is obtained in the obtainment process.

The rotational behavior of the crankshaft varies with the combustion speed of the air-fuel mixture. The combustion speed of air-fuel mixture under a condition where no misfire has occurred is likely to influence the rotational behavior of the crankshaft under a condition where misfires occur. For this reason, the configuration described above includes, in the inputs to the mapping, the moderator variable for controlling the combustion speed. This allows for the calculation of misfire probabilities that reflects a change in the rotational behavior of the crankshaft that results from the combustion speed.

Example 4: The misfire detection device for an internal combustion engine according to any one of Examples 1 to 3, wherein the inputs to the mapping include a state variable of a driveline system connected to the crankshaft, the obtainment process includes obtaining the state variable of the driveline system, and the determination process determines presence or absence of a misfire based on an output of the mapping that is obtained by further including, in the inputs to the mapping, the state variable of the driveline system that is obtained in the obtainment process.

Different states of the driveline system coupled to the crankshaft often result in different rotational behaviors of the crankshaft. For this reason, this configuration includes, in the inputs to the mapping, the state variable of the driveline system. This allows for the calculation of misfire probabilities that reflects a change in the rotational behavior of the crankshaft that results from the state of the driveline system.

Example 5: The misfire detection device for an internal combustion engine according to any one of Examples 1 to 4, wherein the inputs to the mapping include a road surface state variable of a road surface on which a vehicle on which the internal combustion engine is mounted travels, the obtainment process includes obtaining the road surface state variable, and the determination process determines presence or absence of a misfire based on an output of the mapping that is obtained by further including, in the inputs to the mapping, the road surface state variable that is obtained in the obtainment process.

Unevenness in the road surface may vibrate the vehicle and thus the crankshaft. That is, the road surface state affects the rotational behavior of the crankshaft. For this reason, this configuration includes the road surface state variable in the inputs to the mapping. This allows for the calculation of misfire probabilities that reflects a change in the rotational behavior of the crankshaft that results from the road surface state.

Example 6: The misfire detection device for an internal combustion engine according to any one of Examples 1 to 5, wherein the mapping data includes a plurality of types of mapping data stored in the storage device, and the determination process includes a selection process that selects one of the plurality of types of mapping data to be used to determine presence or absence of a misfire.

A mapping that accurately outputs probabilities of misfires under any situation tends to have a complex structure. In this respect, the configuration described above has a plurality of types of mapping data, allowing an appropriate mapping to be selected according to the situation. This configuration enables the plurality of types of mappings to have simple structures, as compared to a configuration in which a single mapping is used for all situations.

Example 7: The misfire detection device for an internal combustion engine according to any one of Examples 1 to 6, wherein the mapping data includes mapping data sets each associated with one of misfire types that are classified according to an interval between cylinders where misfires occur, and the determination process uses the mapping data sets to determine presence or absence of misfires of the respective misfire types.

The angular interval of the crankshaft between misfires varies depending on whether misfires occur in only one cylinder or in multiple cylinders in one combustion cycle. This results in different rotational behaviors of the crankshaft. If a single mapping is used to determine probabilities of misfires of all types, the mapping would need to satisfy many requirements and thus have a complex structure. The configuration described above performs determination by using the probabilities that are output from the mappings prepared for respective types of misfires. This helps to maintain the accuracy in misfire determination without causing the mapping structure to be complex.

Example 8: The misfire detection device for an internal combustion engine according to any one of Examples 1 to 7, wherein the mapping data includes input-side mapping data, which defines an input-side mapping, and output-side mapping data, which defines an output-side mapping, the input-side mapping is a nonlinear mapping that outputs data having fewer dimensions than input data, and the output-side mapping is a nonlinear mapping that takes an output of the input-side mapping as an input to output a probability of a misfire.

This configuration has layers and nonlinearity, allowing the mapping to provide more detailed representation. This increases the accuracy of misfire probabilities obtained according to input variables.

Example 9: The misfire detection device for an internal combustion engine according to Example 8, wherein the output-side mapping includes:
a torque output mapping that takes the output of the input-side mapping as an input to output data on generated torque of the internal combustion engine; and
a probability mapping that outputs a probability that a misfire has occurred, based on an output of the torque output mapping, and the determination process includes:
a torque calculation process that calculates the data on generated torque by inputting the output of the input-side mapping, which takes the time series data of the instantaneous speed parameters as inputs, to the torque output mapping; and
a probability calculation process that calculates the probability by inputting the data on generated torque calculated in the torque calculation process to the probability mapping.

For example, with a mapping that takes time series data of instantaneous speed parameters as inputs to output probabilities of misfires, there may be only insufficient information showing why the mapping gives certain probabilities.

For this reason, the configuration described above uses the generated torque as an intermediate variable, instead of directly outputting misfire probabilities. As such, the process of calculating misfire probabilities using the mapping generates data on the generated torque. The mapping thus provides more detailed representation of the ongoing physical event. This facilitates checking on the validity of the misfire probabilities given by the mapping.

Example 10: The misfire detection device for an internal combustion engine according to Example 8 or 9, wherein
the input-side mapping includes:
a plurality of input-side linear mappings that output linear combination data of the time series data of the instantaneous speed parameters; and
a plurality of input-side nonlinear mappings that perform nonlinear transformation on an output of the respective input-side linear mappings,
the output-side mapping includes:
output-side linear mappings that are equal in number to cylinders and output linear combination data of outputs of the input-side nonlinear mappings; and
output-side nonlinear mappings that perform nonlinear transformation on an output of the respective output-side linear mappings to output data on one of generated torque and a probability that a misfire has occurred in the respective cylinders,
in one of the input-side linear mappings, at least one coefficient for the instantaneous speed parameter that is associated with one of a pair of cylinders that reach compression top dead center in succession to each other, and at least one coefficient for the instantaneous speed parameter that is associated with the other one of the pair of cylinders have a same absolute value and opposite signs, and
the output of the input-side nonlinear mapping that performs nonlinear transformation on the output of the one of the input-side linear mappings is input only to the output-side nonlinear mapping that is associated with one of the pair of cylinders.

When a misfire occurs in one of a pair of cylinders that reach compression top dead center in succession to each other, the instantaneous speed parameter associated with one of the cylinders is likely to differ significantly from the instantaneous speed parameter associated with the other cylinder. Thus, this difference has conventionally been used to determine the presence or absence of misfires. In contrast, when arbitrarily linear combination data of time series data of instantaneous speed parameters is used to output misfire probabilities, the ground for the output given by the mapping tends to be unclear. For this reason, in the mapping with layers of the configuration described above, the variable corresponding to the difference between the instantaneous speed parameter associated with a specific cylinder and the instantaneous speed parameter associated with an adjacent cylinder is input only to the output-side nonlinear mapping that outputs the generated torque or probability for this specific cylinder. The conventional misfire detection method is thus incorporated in the calculation of misfire probabilities. This facilitates checking on the validity of the misfire probabilities given by the mapping.

Example 11: The misfire detection device for an internal combustion engine according to any one of Examples 1 to 10, wherein the response process includes a notification process that operates a notification device, which is the predetermined hardware, to notify that a misfire has occurred.

This configuration notifies that misfires have occurred, prompting reactions to the misfires.

Example 12: The misfire detection device for an internal combustion engine according to any one of Examples 1 to 11, wherein
the predetermined hardware includes a combustion operation portion configured to control combustion of air-fuel mixture in a combustion chamber of the internal combustion engine, and
the response process includes an operation process that operates the combustion operation portion according to information indicating that a misfire has occurred.

When misfires occur, this configuration operates the operation portion, which is used to control the combustion of air-fuel mixture, according to the information indicating that misfires have occurred. This enables correction of the condition that causes misfires and reduction of adverse effects from the misfires.

Example 13: A misfire detection system for an internal combustion engine comprising:
the execution device according to any one of Examples 1 to 12; and
the storage device according to any one of Examples 1 to 12, wherein
the determination process includes:
an output calculation process that calculates an output of the mapping; and
a process that determines presence or absence of a misfire based on the output of the output calculation process,
the execution device includes a first execution device and a second execution device,
the first execution device is mounted on a vehicle and is configured to perform:
the obtainment process;
a vehicle-side transmission process that transmits data obtained in the obtainment process to outside of the vehicle;
a vehicle-side reception process that receives a signal based on the output calculated in the output calculation process; and
the response process,
the second execution device is located outside the vehicle and is configured to perform:
an external reception process that receives the data transmitted in the vehicle-side transmission process;
the output calculation process; and
an external transmission process that transmits the signal based on the output calculated in the output calculation process to the vehicle.

This configuration performs the output calculation process outside the vehicle. This reduces the computation load of the on-board device.

Example 14: A data analysis device comprising:
the second execution device according to Example 13; and
the storage device according to Example 13.

Example 15: A controller for an internal combustion engine comprising the first execution device according to Example 13.

Example 16: A misfire detection system for an internal combustion engine comprising:
a first execution device;
a second execution device; and
a storage device, wherein
the storage device stores mapping data that defines a mapping that takes time series data of instantaneous speed parameters as inputs to output a probability that a misfire has occurred in the internal combustion engine, each instantaneous speed parameter corresponding to one of a plurality of successive second intervals in a first interval, the second execution device or both of the first and second execution devices are configured to perform determination process that determines presence or absence of a misfire based on an output of the mapping that takes the time series data as inputs, the determination process includes:
an output calculation process that calculates an output of the mapping; and
a process that determines presence or absence of a misfire based on the output of the output calculation process, the first execution device is mounted on a vehicle and is configured to perform:
an obtainment process that obtains the instantaneous speed parameters based on a detection value of a sensor that detects rotational behavior of a crankshaft of the internal combustion engine;
a vehicle-side transmission process that transmits data obtained in the obtainment process to outside of the vehicle;
a vehicle-side reception process that receives a signal based on the output calculated in the output calculation process; and
a response process that, when the determination process determines that a misfire has occurred, operates predetermined hardware to respond to a situation where the misfire has occurred, the second execution device is located outside the vehicle and is configured to perform:
an external reception process that receives the data transmitted in the vehicle-side transmission process;
the output calculation process; and
an external transmission process that transmits the signal based on the output calculated in the output calculation process to the vehicle, the instantaneous speed parameters correspond to rotational speed of the crankshaft, the first interval is a rotational angular interval of the crankshaft in which compression top dead center occurs, the second interval is smaller than an interval between compression top dead center positions, the mapping outputs a probability that a misfire has occurred in at least one cylinder that reaches compression top dead center in the first interval, and the mapping data is data that has been learned by machine learning.

Example 17: A misfire detection method for an internal combustion engine configured to perform the processes according to any one of Examples 1 to 15. Specifically, the method includes:

storing mapping data that defines a mapping in a storage device, wherein the mapping takes time series data of instantaneous speed parameters as inputs to output a probability that a misfire has occurred in the internal combustion engine, each instantaneous speed parameter corresponding to one of a plurality of successive second intervals in a first interval;

obtaining, using an execution device, the instantaneous speed parameters based on a detection value of a sensor that detects rotational behavior of a crankshaft of the internal combustion engine;

determining, using the execution device, presence or absence of a misfire based on an output of the mapping, which takes the time series data as inputs; and when it is determined that a misfire has occurred, operating, using the execution device, predetermined hardware to respond to a situation where the misfire has occurred, wherein the instantaneous speed parameters correspond to rotational speed of the crankshaft, the first interval is a rotational angular interval of the crankshaft in which compression top dead center occurs, the second interval is smaller than an interval between compression top dead center positions, the mapping outputs a probability that a misfire has occurred in at least one cylinder that reaches compression top dead center in the first interval, and the mapping data is data that has been learned by machine learning.

Example 18: A non-transitory computer readable medium that stores a program that causes the processes according to any one of Examples 1 to 15 to be performed.

Example 19: In any one of Examples 1 to 18, each instantaneous speed parameter corresponds to the rotational speed at which the crankshaft rotates by the corresponding one of the second intervals.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Referring to FIGS. 1 to 5, a first embodiment of a misfire detection device for an internal combustion engine is now described.

Figure 1:
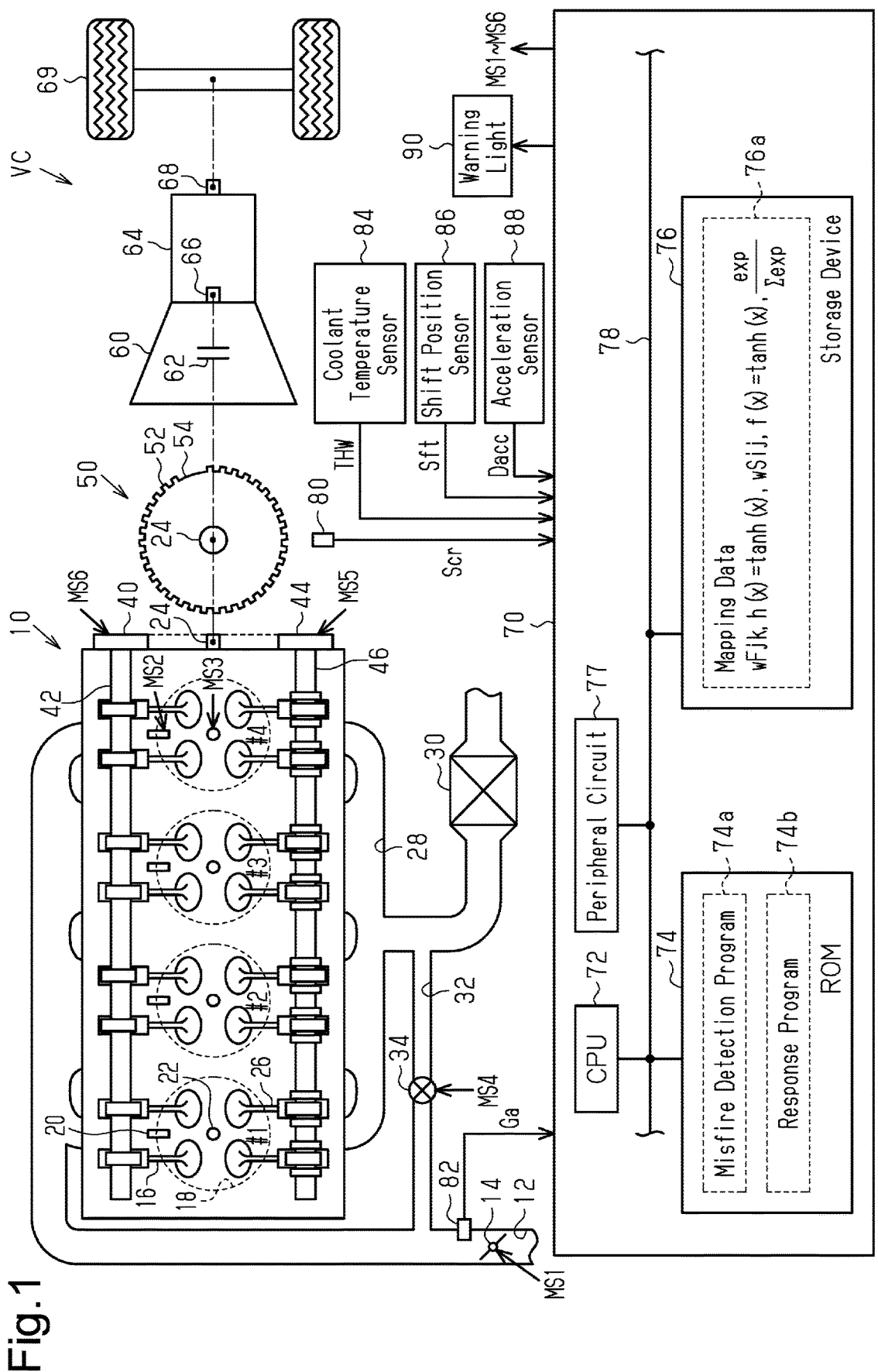
FIG. 1 is a diagram showing a configuration of a controller and a driveline of a vehicle according to a first embodiment.

FIG. 1 shows an internal combustion engine 10 mounted in a vehicle VC. The internal combustion engine 10 has an intake passage 12 including a throttle valve 14. The intake air in the intake passage 12 flows into the combustion chambers 18 of cylinders #1 to #4 when the intake valves 16 are open. The internal combustion engine 10 includes fuel injection valves 20, which inject fuel, and ignition devices 22, which generate spark discharge. The fuel injection valves 20 and the ignition devices 22 are exposed to the combustion chambers 18. The air-fuel mixture is burned in the combustion chambers 18, and the energy generated by the combustion is output as the rotation energy for the crankshaft 24. The air-fuel mixture used for combustion is discharged as exhaust gas into the exhaust passage 28 when the exhaust valves 26 are open. The exhaust passage 28 includes a three-way catalyst 30 with oxygen storage capacity. The exhaust passage 28 communicates with the intake passage 12 via an EGR passage 32. The EGR passage 32 includes an EGR valve 34 for adjusting the cross-sectional area of the flow passage.

The rotational force of the crankshaft 24 is transmitted to an intake camshaft 42 via an intake variable valve timing system 40. The rotational force is also transmitted to an exhaust camshaft 46 via an exhaust variable valve timing system 44. The intake variable valve timing system 40 alters the difference between the rotation phases of the intake camshaft 42 and the crankshaft 24. The exhaust variable valve timing system 44 alters the difference between the rotation phases of the exhaust camshaft 46 and the crankshaft 24.

The crankshaft 24 of the internal combustion engine 10 is connectable to an input shaft 66 of a transmission 64 via a torque converter 60. The torque converter 60 includes a lockup clutch 62, and the crankshaft 24 is connected to the input shaft 66 when the lockup clutch 62 is in an engaged position. The transmission 64 also has an output shaft 68 mechanically coupled to drive wheels 69. In the present embodiment, the transmission 64 is a stepped transmission that has first to fifth gear ratios.

The crankshaft 24 is connected to a crank rotor 50 having teeth 52 each indicating a corresponding one of a plurality of (34 in this example) rotational angles of the crankshaft 24. The teeth 52 are positioned on the crank rotor 50 at intervals of 10° CA, except for one missing-teeth part 54 where adjacent teeth 52 are spaced apart from each other by 30° CA. This part indicates the reference rotational angle of the crankshaft 24.

A controller 70 controls the internal combustion engine 10 and operates the throttle valve 14, the fuel injection valves 20, the ignition devices 22, the EGR valve 34, the intake variable valve timing system 40, and the exhaust variable valve timing system 44 to control the controlled variables of the internal combustion engine 10, such as the torque and exhaust gas composition ratio. FIG. 1 shows operation signals MS1 to MS6 for the throttle valve 14, the fuel injection valves 20, the ignition devices 22, the EGR valve 34, the intake variable valve timing system 40, and the exhaust variable valve timing system 44.

To control controlled variables, the controller 70 refers to an output signal Scr of a crank angle sensor 80, which outputs a pulse for each angular interval between the teeth 52 (10° CA except for the missing-teeth part 54), and the intake air amount Ga detected by an air flowmeter 82. The controller 70 also refers to the temperature of the coolant of the internal combustion engine 10 (coolant temperature THW) detected by a coolant temperature sensor 84, the shift position Sft of the transmission 64 detected by a shift position sensor 86, and the acceleration Dacc in the vertical direction of the vehicle VC detected by an acceleration sensor 88.

The controller 70 includes a CPU 72, a ROM 74, an electrically rewritable nonvolatile memory (a storage device 76), and peripheral circuits 77, which can communicate with one another via a local network 78. The peripheral circuits 77 include a circuit that generates clock signals for regulating the internal operation, a power supply circuit, and a reset circuit.

The CPU 72 executes a program stored in the ROM 74 allowing the controller 70 to control the controlled variables. In addition, the controller 70 performs a process of determining the presence or absence of misfires in the internal combustion engine 10.

Figure 2:
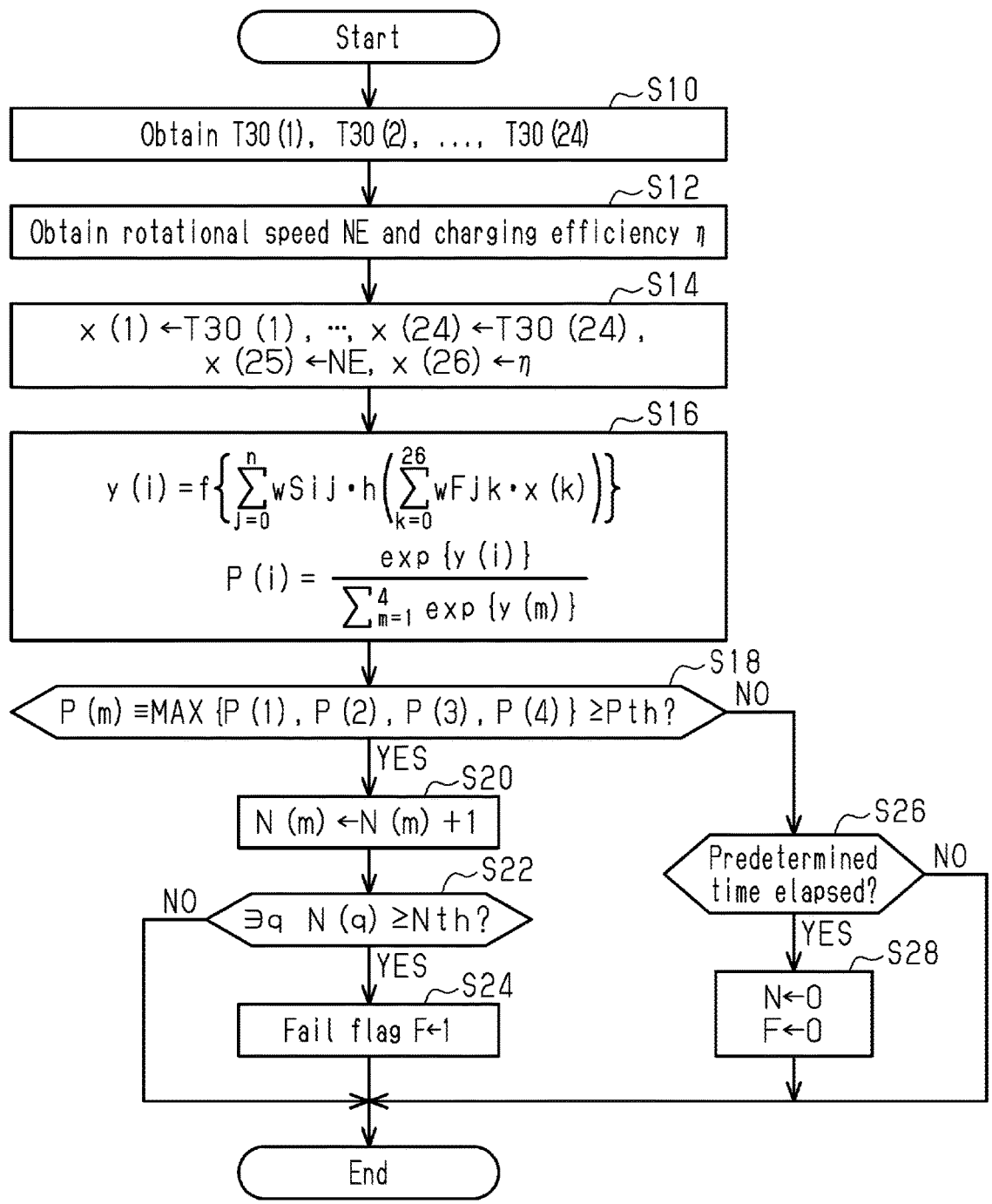
FIG. 2 is a flowchart showing the procedure of a misfire detection process according to the first embodiment.

FIG. 2 shows the procedure of a misfire detection process. To perform the process shown in FIG. 2, the CPU 72 may repeatedly execute a misfire detection program 74a stored in the ROM 74, which is shown in FIG. 1, in predetermined cycles. In the following descriptions, the numbers prefixed with S represent step numbers in each process.

In the process shown in FIG. 2, the CPU 72 first obtains minute rotation durations T30(1), T30(2), . . . , T30(24) (S10). Based on the output signal Scr from the crank angle sensor 80, the CPU 72 obtains a minute rotation duration T30 by measuring the time required for the crankshaft 24 to rotate 30° CA. Different numbers in parentheses, such as in minute rotation durations T30(1) and T30(2), represent different rotational angular intervals within the range of 720° CA corresponding to one combustion cycle. That is, the 720° CA rotational angle range (the first interval) is divided into equal 30° CA angular intervals (the second intervals), and minute rotation durations T30(1) to T30(24) corresponds to respective second intervals. In other words, each minute rotation duration T30 is an instantaneous speed parameter (an instantaneous speed variable) corresponding to the rotational speed at which the crankshaft 24 rotates by the corresponding one of the angular intervals (30° CA, or second intervals).

Specifically, based on the output signal Scr, the CPU 72 measures the time required for the crankshaft 24 to rotate 30° CA, and sets this time as an unfiltered duration NF30. Then, the CPU 72 obtains filtered durations AF30 by applying a digital filter to unfiltered durations NF30. The CPU 72 then obtains the minute rotation durations T30 by normalizing the filtered durations AF30 such that the difference between the local maximum (maximum value) and the local minimum (minimum value) of the filtered durations AF30 measured in a predetermined period (e.g., 720° CA) is 1.

Next, the CPU 72 obtains the rotational speed NE and the charging efficiency η (S12). The CPU 72 calculates the rotational speed NE based on the output signal Scr of the crank angle sensor 80, and calculates the charging efficiency η based on the rotational speed NE and the intake air amount Ga. The rotational speed NE is the average rotational speed obtained when the crankshaft 24 rotates by an angular interval larger than the interval between compression top dead center positions (180° CA in this embodiment). The rotational speed NE is preferably the average rotational speed obtained when the crankshaft 24 rotates by the rotational angle corresponding to one revolution of the crankshaft 24 or more. The average does not have to be a simple average, and may be an exponential moving average. The average may be calculated from a plurality of sampled values such as minute rotation durations T30 obtained when the crankshaft 24 rotates by a rotational angle that corresponds to one revolution or more. The charging efficiency η is a parameter that determines the amount of air charged into the combustion chambers 18.

Then, the CPU 72 assigns the values obtained at steps S10 and S12 to input variables $x(1)$ to $x(26)$ of a mapping for calculating probabilities that a misfire has occurred (S14). Specifically, the CPU 72 assigns minute rotation durations $T30(s)$ to input variables $x(s)$, so that s is 1 to 24. That is, the input variables $x(1)$ to $x(24)$ are time series data of the minute rotation durations T30. In addition, the CPU 72 assigns the rotational speed NE to the input variable $x(25)$ and assigns the charging efficiency η to the input variable $x(26)$.

The CPU 72 then inputs the input variables $x(1)$ to $x(26)$ to the mapping defined by mapping data 76a, which is stored in the storage device 76 shown in FIG. 1, to calculate probabilities $P(i)$ that misfires have occurred in cylinders #i (i=1 to 4) (S16). The mapping data 76a defines a mapping that outputs probabilities $P(i)$ that misfires have occurred in cylinders #i in the period corresponding to the minute rotation durations $T30(1)$ to $T30(24)$ obtained at step S10. A probability $P(i)$ is a quantified representation of the likelihood that a misfire has actually occurred, which is obtained based on the input variables $x(1)$ to $x(26)$. In the present embodiment, the maximum value of probabilities $P(i)$ that misfires have occurred in cylinders #i is smaller than 1, and the minimum value is greater than 0. That is, in the present embodiment, the level of likelihood of an actual misfire is quantified into a continuous variable in the predetermined range that is greater than 0 and less than 1.

In the present embodiment, this mapping includes a neural network, which has one intermediate layer, and the softmax function that normalizes the outputs of the neural network so that the sum of the probabilities $P(1)$ to $P(4)$ of misfires is equal to 1. The neural network includes input-side coefficients wFjk (j=0 to n, k=0 to 26) and activation functions $h(x)$. The input-side coefficients wFjkAn define input-side linear mappings, and the activation functions $h(x)$ are input-side nonlinear mappings that perform nonlinear transformation on the output of the respective input-side linear mappings. In the present embodiment, the hyperbolic tangent tan $h(x)$ is used as the activation function $h(x)$. The neural network also includes output-side coefficients wSij (i=1 to 4, j=0 to n) and activation functions $f(x)$. The output-side coefficients wSij define output-side linear mappings, and the activation functions $f(x)$ are output-side nonlinear mappings that perform nonlinear transformation on the output of the respective output-side linear mappings. In the present embodiment, the hyperbolic tangent tan $h(x)$ is used as the activation function $f(x)$. The value n indicates the dimension in the intermediate layer. In the present embodiment, the value n is smaller than the number of dimensions of the input variables x (26 dimensions in this example). Input-side coefficients wFj0 are bias parameters and used as coefficients for input variable $x(0)$, which is defined as 1. Output-side coefficients wSi0 are bias parameters and multiplied by 1. For example, this may be achieved by defining that wF00·x(0)+wF01·x(1)+ . . . is identically infinite.

Specifically, the CPU 72 calculates original probabilities $y(i)$, which are outputs of the neural network defined by the input-side coefficients wFjk, output-side coefficients wSij, and activation functions $h(x)$ and $f(x)$. The original probabilities $y(i)$ are parameters correlated positively with the probabilities that misfires have occurred in cylinders #i. The CPU 72 inputs the original probabilities $y(1)$ to $y(4)$ to the softmax function and obtains probabilities $P(i)$ that misfires have occurred in cylinders #i as outputs.

Then, the CPU 72 determines whether the maximum value $P(m)$ of the probabilities $P(1)$ to $P(4)$ of misfires is greater than or equal to a threshold value Pth (S18). Here, the variable m takes a value from 1 to 4, and the threshold value Pth is set to a value greater than or equal to ½. When determining that the maximum value $P(m)$ is greater than or equal to the threshold value Pth (S18: YES), the CPU 72 increments the number $N(m)$ of misfire events of the cylinder #m with the maximum probability (S20). The CPU 72 then determines whether any of the numbers $N(1)$ to $N(4)$ is greater than or equal to a predetermined number Nth (S22). When determining that any of the numbers $N(1)$ to $N(4)$ is greater than or equal to the predetermined number Nth (S22: YES), the CPU 72 determines that misfires are occurring in a specific cylinder #q (q is one of 1 to 4) at a frequency exceeding the permissible level, and assigns 1 to a fail flag F (S24). The CPU 72 maintains the information on the misfiring cylinder #q by saving the information in the storage device 76, for example, at least until the misfire problem is resolved in this cylinder #q.

When determining that the maximum value $P(m)$ is less than the threshold value Pth (S18: NO), the CPU 72 then determines whether a predetermined time has elapsed since step S24 or step S28, which will be described below, is performed (S26). This predetermined time is longer than the duration of one combustion cycle, and preferably ten times longer than one combustion cycle or longer.

When determining that the predetermined time has elapsed (S26: YES), the CPU 72 resets the numbers $N(1)$ to $N(4)$ and also resets the fail flag F (S28).

The CPU 72 ends the sequence shown in FIG. 2 when step S24 or S28 is completed or if the outcome is negative at step S22 or S26.

Figure 3:
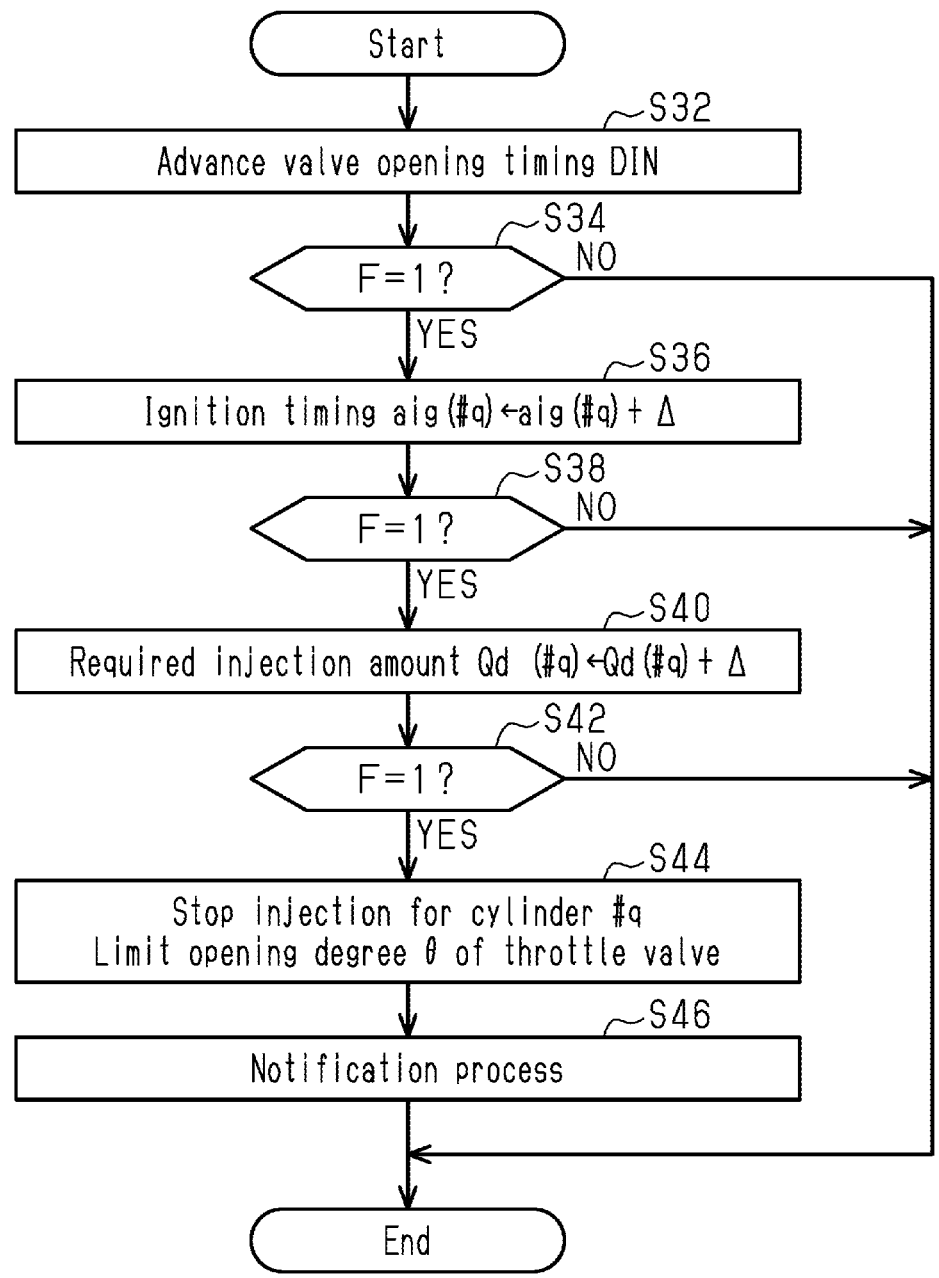
FIG. 3 is a flowchart showing the procedure of a misfire response process according to the first embodiment.

FIG. 3 shows a procedure for responding to misfires. When the fail flag F is switched from 0 to 1, the CPU 72 executes a response program 74b, which is stored in the ROM 74 shown in FIG. 1, to start the process of FIG. 3.

In the process shown in FIG. 3, the CPU 72 first advances the valve opening timing DIN of the intake valves 16 by outputting an operation signal MS6 to the intake variable valve timing system 40 to operate the intake variable valve timing system 40 (S32). Specifically, in the normal condition where the fail flag F is 0, the valve opening timing DIN is variably set according to the operating point of the internal combustion engine 10. At step S32, the actual valve opening timing DIN is advanced relative to the valve opening timing DIN in the normal condition. The purpose of step S32 is to stabilize the combustion by increasing the compression ratio.

Then, after continuing the control at S32 for the predetermined time or longer, the CPU 72 determines whether the fail flag F is 1 (S34). This step determines whether the condition that causes misfires has been resolved by step S32. When determining that the fail flag F is 1 (S34: YES), the CPU 72 outputs an operation signal MS3 to the ignition device 22 for the misfiring cylinder #q, thereby operating the ignition device 22 to advance the ignition timing aig by a predetermined amount A (S36). The purpose of this step is to resolve the condition that causes misfires.

Then, after continuing the control at S36 for the predetermined time or longer, the CPU 72 determines whether the fail flag F is 1 (S38). This step determines whether the condition that causes misfires has been resolved by step S36. When determining that the fail flag F is 1 (S38: YES), the CPU 72 outputs an operation signal MS2 to the fuel injection valve 20 for the misfiring cylinder #q, thereby operating this fuel injection valve 20 to increase the required injection amount Qd, which is the amount of fuel required for the fuel injection valve 20 to inject in one combustion cycle, by a predetermined amount (S40). The purpose of this step is to resolve the condition that causes misfires.

Then, after continuing the control at S40 for the predetermined time or longer, the CPU 72 determines whether the fail flag F is 1 (S42). This step determines whether the condition that causes misfires has been resolved by step S40. When determining that the fail flag F is 1 (S42: YES), the CPU 72 stops the fuel injection for the misfiring cylinder #q and adjusts the operation signal MS1 sent to the throttle valve 14 so as to operate the throttle valve 14 while limiting the opening degree θ of the throttle valve 14 to a smaller value (S44). Then, the CPU72 operates the warning light 90 shown in FIG. 1 to notify that misfires have occurred (S46).

When determining that the outcome is negative at step S34, S38 or S42, in other words, the misfires are resolved, or completing step S46, the CPU 72 ends the sequence of FIG. 3. If the outcome is affirmative at step S42, step S44 is continued as a fail-safe process.

A method for generating the mapping data 76a is now described.

Figure 4:
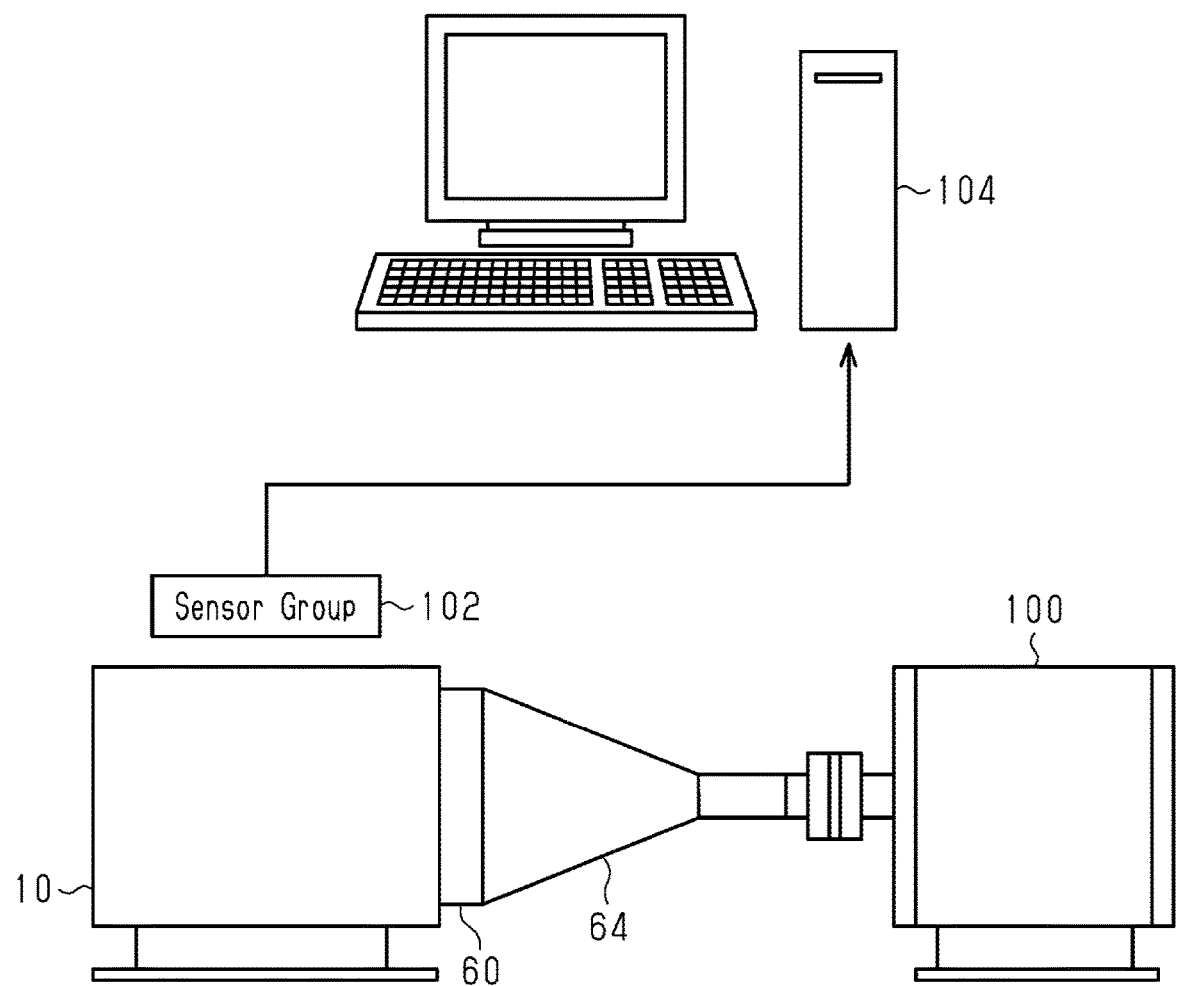
FIG. 4 is a diagram showing a system for generating mapping data according to the first embodiment.

FIG. 4 shows a system for generating the mapping data 76a.

As shown in FIG. 4, in this embodiment, the crankshaft 24 of the internal combustion engine 10 is mechanically connected to a dynamometer 100 via the torque converter 60 and the transmission 64. A sensor group 102 detects a variety of state variables while the internal combustion engine 10 is in operation. The detection results are input to a fitting device 104, which is a computer that generates the mapping data 76a. The sensor group 102 includes the crank angle sensor 80 and the air flowmeter 82, which detect values used to generate inputs to the mapping. The sensor group 102 may also include in-cylinder pressure sensors so that the presence or absence of misfires is identified in a reliable manner.

Figure 5:
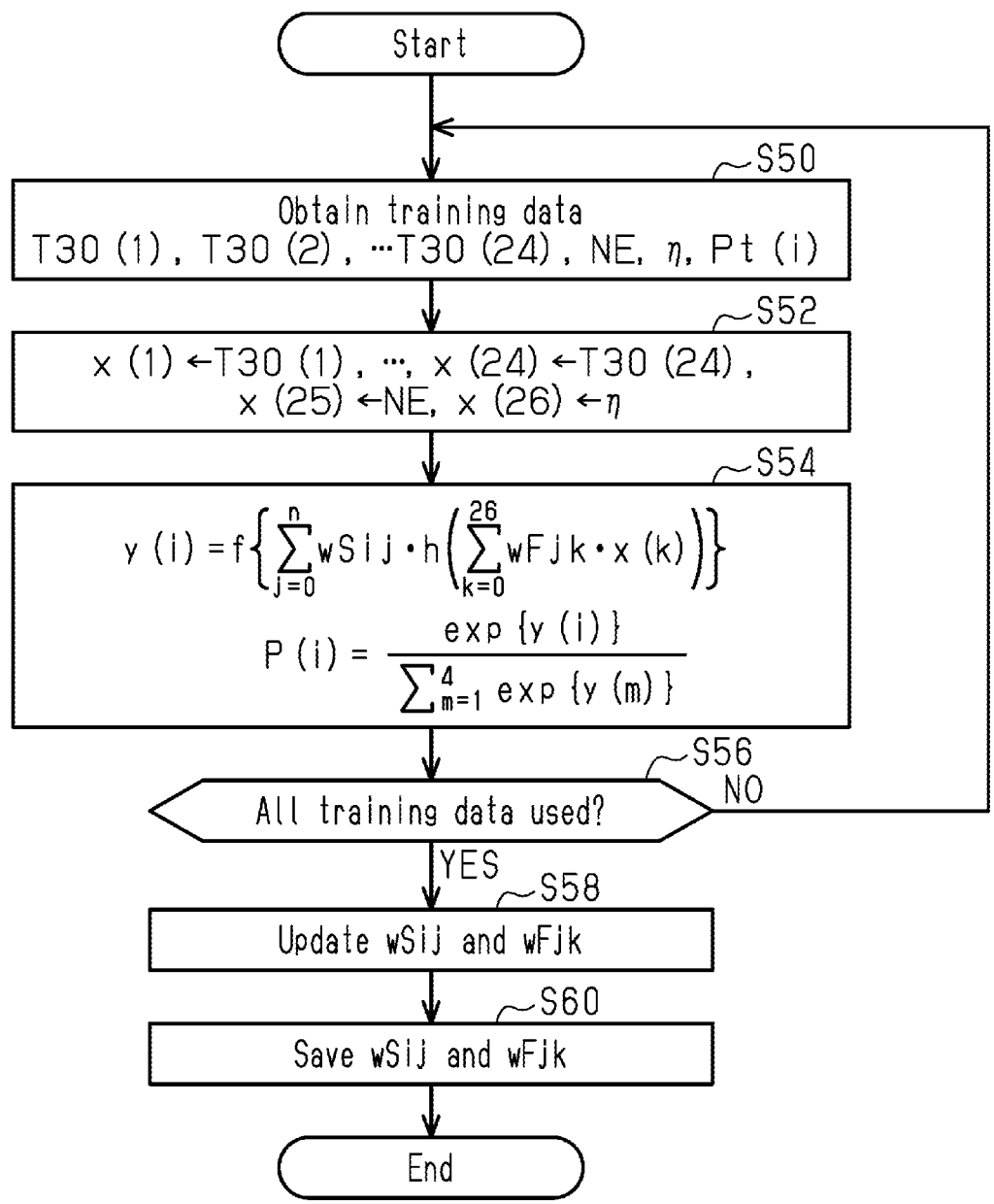
FIG. 5 is a flowchart showing the procedure of a mapping data learning process according to the first embodiment.

FIG. 5 shows how the mapping data is generated. The process shown in FIG. 5 is performed by the fitting device 104. For example, the fitting device 104 may include a CPU and a ROM, and the process shown in FIG. 5 may be performed when the CPU runs a program stored in the ROM.

In the process shown in FIG. 5, the fitting device 104 first obtains training data that is generated based on the detection results of the sensor group 102. The training data includes a plurality of sets of minute rotation durations T30(1) to T30(24), rotational speed NE, charging efficiency η, and true misfire probabilities Pt(i) (S50). The true probabilities Pt(i) are 1 when misfires have occurred, and are 0 when no misfire has occurred. The true probabilities Pt(i) may be calculated based on values detected by the in-cylinder pressure sensors, which detect a parameter other than the parameters defining the input variables x(1) to x(26). To generate the training data, fuel injection may be intentionally stopped for a given cylinder to create a state similar to that with misfires. In this case, the in-cylinder pressure sensors or similar sensors are still used to detect any misfires in the cylinders to which fuel is injected.

In a similar manner as step S14, the fitting device 104 assigns the training data except for the true probabilities Pt(i) to the input variables x(1) to x(26) of the mapping for obtaining misfire probabilities (S52). Then, in the same manner as step S16, the fitting device 104 calculates probabilities P(1) to P(4) of misfires for respective cylinders #1 to #4 (S54). The fitting device 104 then determines whether the process of S50 to S54 has been performed on all training data detected by the sensor group 102 (S56). When determining that there is training data that is not yet subjected to the process of S50 to S54 (S56: NO), the fitting device 104 proceeds to step S50 to perform the process of S50 to S54 on the unprocessed training data.

When determining that all the training data detected by the sensor group 102 is subjected to the process of S50 to S54 (S56: YES), the fitting device 104 updates the input-side coefficients wFjk and the output-side coefficients wSij so as to minimize the cross entropy between the probabilities P(i) calculated at S54 and the true probabilities Pt(i) (S58). Then, the fitting device 104 saves the updated input-side coefficients wFjk, output-side coefficients wSij, and other data as the learned mapping data (S60).

After step S60, the probabilities P(i) calculated using the mapping defined by the input-side coefficients wFjk and the output-side coefficients wSij saved at step S60 are verified for accuracy. If the accuracy is outside the permissible range, the internal combustion engine 10 is operated to generate additional training data, and the process of S50 to S60 is repeated. When the accuracy falls within the permissible range, the input-side coefficients wFjk, output-side coefficients wSij, and other data are set as the mapping data 76a to be implemented in the controller 70.

The operation and advantages of the present embodiment are now described.

While the internal combustion engine 10 is in operation, the CPU 72 sequentially calculates the minute rotation durations T30 and inputs the minute rotation durations T30 corresponding to one combustion cycle to the mapping defined by the mapping data 76a, thereby obtaining probabilities P(1) to P(4) that misfires have occurred in respective cylinders #1 to #4. The minute rotation duration T30 is a parameter indicating the rotational speed of the crankshaft 24 corresponding to an angular interval smaller than 180°

CA, which is the interval between compression top dead center positions. The minute rotation duration T30 for each 30° CA in one combustion cycle is input to the mapping. Further, the values of the input-side coefficients wFjk and the output-side coefficients wSij used for the computation on the minute rotation durations T30 are values that have been learned by the machine learning shown in FIG. 5. The probabilities P(i) of misfires are thus calculated based on the rotational behavior of the crankshaft 24 in minute time scale. Consequently, as compared to a configuration that determines the presence or absence of misfires based on the difference between the durations needed to rotate adjacent angular intervals that are substantially equal to the intervals between compression top dead center positions, the present embodiment determines the presence or absence of misfires based on more detailed information on the rotational behavior of the crankshaft 24. This increases the accuracy of misfire determination.

Second Embodiment

A second embodiment will now be described with reference to FIG. 6. The differences from the first embodiment will mainly be discussed.

In this embodiment, the number of dimensions of the input variables x is increased.

Figure 6:
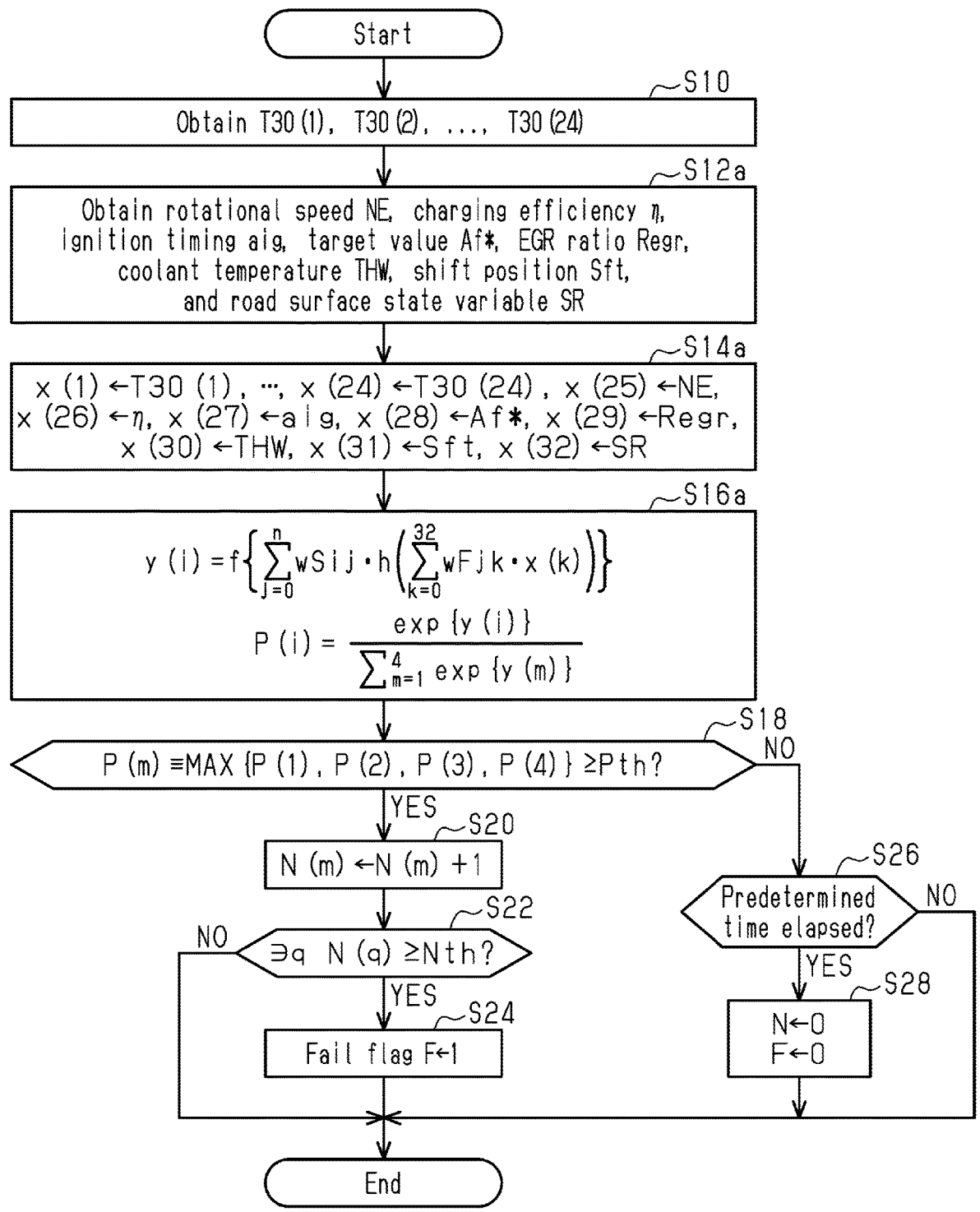
FIG. 6 is a flowchart showing the procedure of a misfire detection process according to a second embodiment.

FIG. 6 shows the procedure of a misfire detection process according to the present embodiment. To perform the process shown in FIG. 6, the CPU 72 may repeatedly execute the misfire detection program 74a stored in the ROM 74 in predetermined cycles. The same step numbers are given to the steps in FIG. 6 that correspond to steps shown in FIG. 2. Such steps will not be described in detail.

In the process shown in FIG. 6, after step S10, the CPU 72 obtains the ignition timing aig, air-fuel ratio target value Af*, EGR ratio Regr, coolant temperature THW, shift position Sft, and road surface state variable SR, in addition to the rotational speed NE and charging efficiency η (S12a). The EGR ratio is the ratio of the fluid flowing into the intake passage 12 from the EGR passage 32 to the fluid flowing in the intake passage 12. The road surface state variable SR is a parameter calculated by the CPU 72 based on the acceleration Dacc. For example, the road surface state variable SR may be a binary variable that takes two values, one for when the road surface is rough and the other for when the road surface is smooth. The state variable SR may be generated in the same manner as the process of setting a value of a rough road determination flag Fb shown in FIG. 14, which will be described below.

The CPU 72 inputs the data obtained at steps S10 and S12a to the input variables x(1) to x(32) of the mapping (S14a). The ignition timing aig, target value Af*, and EGR ratio Regr are parameters (moderator variables) that are adjusted by operating operation portions of the internal combustion engine 10 to control the combustion speed of the air-fuel mixture in the combustion chambers 18. That is, the ignition timing aig corresponds to an operation amount of the ignition devices 22, which serve as operation portions. The ignition timing aig is a moderator variable that is adjusted by operating the ignition devices 22 to control the combustion speed. The target value Af* is a moderator variable that is adjusted by operating the fuel injection valves 20, which serve as operation portions, to control the combustion speed. The EGR ratio Regr is a moderator variable that is adjusted by operating the EGR valve 34, which serves as an operation portion, to control the combustion speed. The behavior of the crankshaft 24 varies with the combustion speed of air-fuel mixture. These moderator variables are added as input variables x because the combustion speed of the air-fuel mixture measured when no misfire has occurred is likely to influence the rotational behavior of the crankshaft 24 exhibited when misfires have occurred.

The coolant temperature THW is a state variable of the internal combustion engine 10 and is a parameter that changes the friction of the sliding portions, such as the friction between the pistons and the cylinders. Since the coolant temperature THW affects the rotational behavior of the crankshaft 24, the present embodiment includes the coolant temperature THW as an input variable x.

The shift position Sft is a state variable of the driveline system connected to the crankshaft 24. Different shift positions Sft have different inertia constants from the crankshaft 24 to the drive wheels 69, resulting in different rotational behaviors of the crankshaft 24. The shift position Sft is therefore used as an input variable x.

Unevenness in the road surface vibrates the vehicle VC, and this vibration is transferred to the crankshaft 24. Thus, the rotational behavior of the crankshaft 24 varies with the road surface state. The present embodiment therefore includes the road surface state variable SR as an input variable x.

After step S14a, the CPU 72 inputs the input variables x(1) to x(32) to the mapping defined by mapping data 76a to calculate the misfire probabilities P(1) to P(4) for the cylinders #1 to #4 (S16a). The mapping data according to the present embodiment differs from that of the first embodiment in the number of the input-side coefficients wFjk (j=0 to n, k=0 to 32) and the output-side coefficients wSij (i=1 to 4, j=0 to n).

After step S16a, the CPU 72 proceeds to step S18.

In the present embodiment, the training data obtained at step S50 in FIG. 5 includes all the parameters obtained at S12a, step S52 is performed in a similar manner as step S14a, and step S54 uses a mapping with input variables x of 32 dimensions. Here, the input variable x(0) is not counted as a dimension. The training data corresponding to a situation where the state variable SR indicates that the road surface is rough may be generated based on detection values obtained by the sensor group 102 shown in FIG. 4. These detection values may be obtained while the load torque that acts on the crankshaft 24 when the vehicle vibrates is simulated using the dynamometer 100 shown in FIG. 4. Alternatively, the internal combustion engine 10 and the dynamometer 100 shown in FIG. 4 may be placed and vibrated on a device that generates vibration, so that the load torque that acts on the crankshaft 24 when the vehicle vibrates is simulated. The training data may be generated based on the detection values obtained by the sensor group 102 shown in FIG. 4 under this condition.

In the present embodiment, the input variables x further include moderator variables that control the combustion speed, a state variable of the internal combustion engine 10, a state variable of the driveline system, and a state variable SR of the road surface. Even though these parameters affect the rotational behavior of the crankshaft 24, it has been difficult to take them into account in a conventional method for determining the presence or absence of misfires based on the difference between the durations required for rotation in adjacent angular intervals. With a conventional method, taking these parameters into account would require an enormous amount of fitting time and is thus unrealistic. However, the present embodiment uses machine learning and thus allows these parameters to be taken into account within a practical fitting time range to build logic for determination of misfires.

Third Embodiment

A third embodiment will now be described with reference to FIGS. 7 to 10. The differences from the first embodiment will mainly be discussed.

The first embodiment uses the mapping that takes minute rotation durations T30 as inputs to output probabilities P(i) that misfires have occurred, and thus the process of determination of misfires may seem like a "black box." In this respect, the present embodiment uses a clarified logical structure for misfire determination that is easier to understand by humans.

Figure 7:
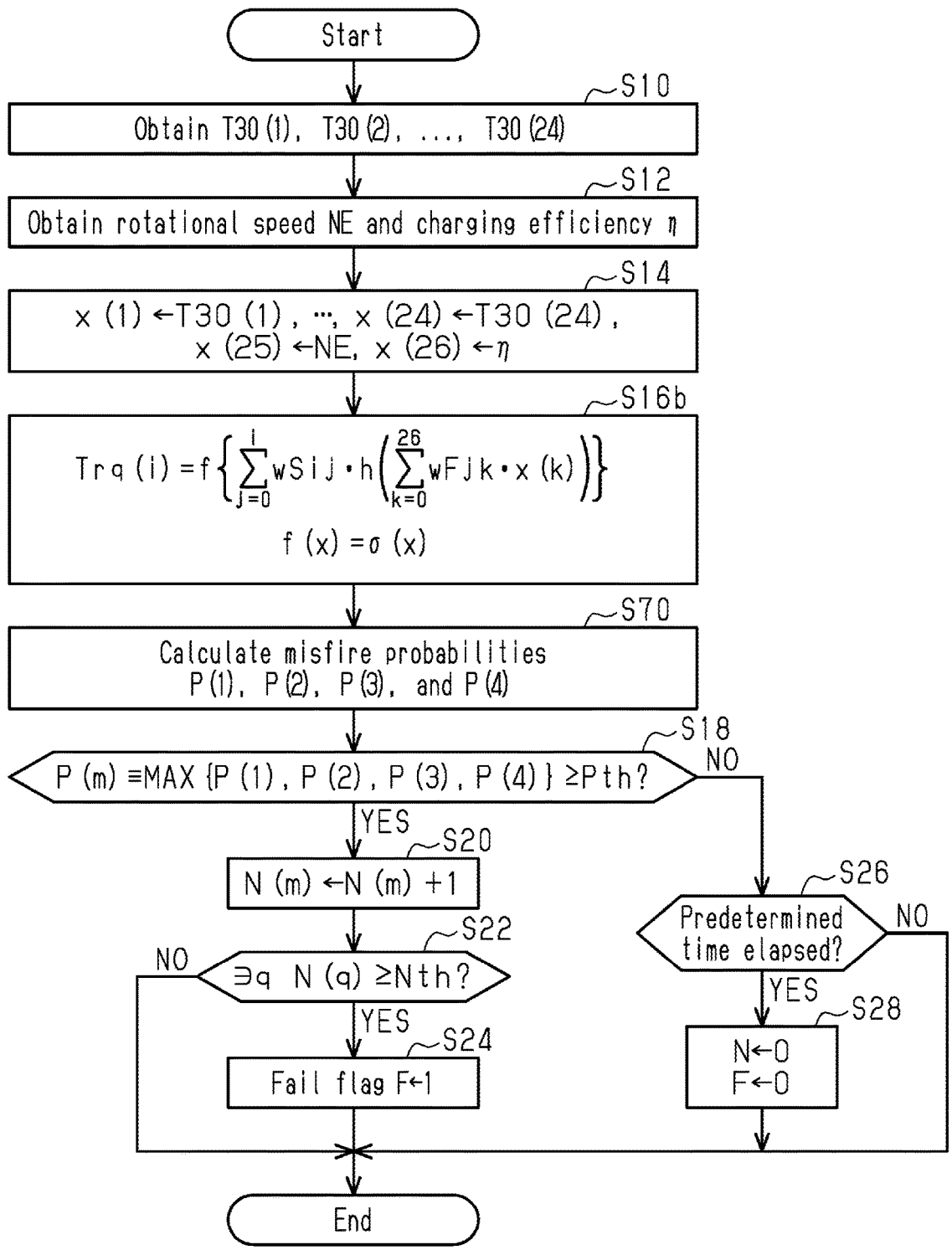
FIG. 7 is a flowchart showing the procedure of a misfire detection process according to a third embodiment.

FIG. 7 shows the procedure of a misfire detection process according to the present embodiment. To perform the process shown in FIG. 7, the CPU 72 may repeatedly execute the misfire detection program 74a stored in the ROM 74 in predetermined cycles. The same step numbers are given to the steps in FIG. 7 that correspond to steps shown in FIG. 2. Such steps will not be described in detail.

In the process shown in FIG. 7, after step S14, the CPU 72 inputs input variables x into a mapping defined by mapping data 76a to calculate torque reduction ratios Trq(i) (S16b). The torque reduction ratio Trq(i) is a parameter obtained by normalizing the generated torque to a value in the range of 0 to 1. The torque reduction ratio Trq(i) is a ratio of a value obtained by subtracting the actual torque from a reference torque to the reference torque, and takes a value of 0 or more and 1 or less. The mapping data 76a according to the present embodiment defines a neural network that has one intermediate layer and outputs torque reduction ratios Trq(i). Specifically, the logistic sigmoid function $\sigma(x)$ is used as the activation function $f(x)$ that performs nonlinear transformation on the output of a linear mapping defined by output-side coefficients wSij. The mapping thus outputs torque reduction ratios Trq(i) that are arbitrary values between 0 to 1.

Figure 8:
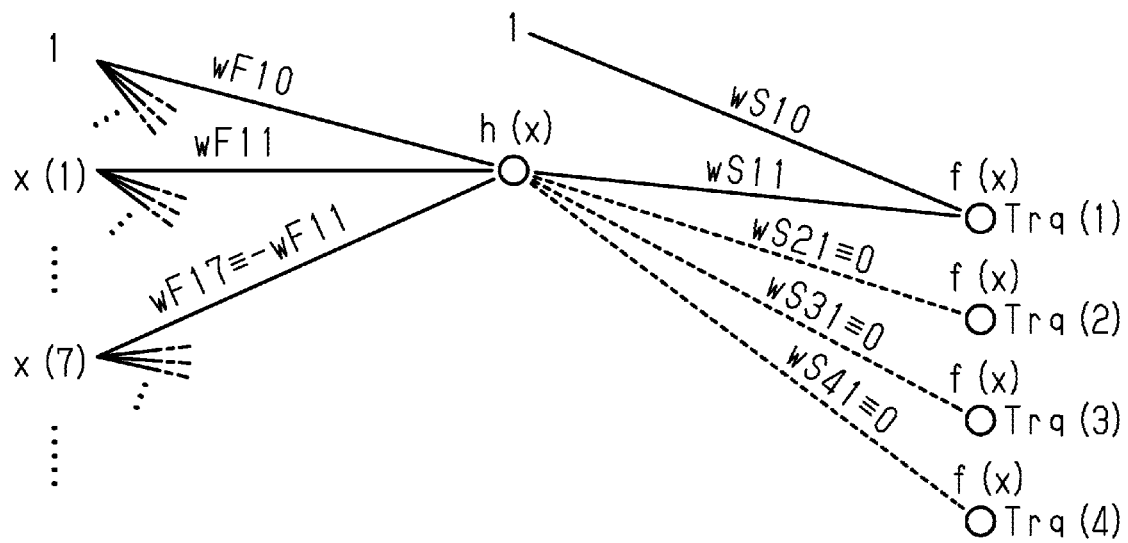
FIG. 8 is a diagram showing a part of the structure of a neural network according to the third embodiment.

In addition, the present embodiment has constraints imposed on input-side coefficients wFjk and output-side coefficients wSij. FIG. 8 shows some of the constraints on input-side coefficients wFjk and output-side coefficients wSij.

As shown in FIG. 8, in this embodiment, the input-side coefficients wF11 and wF17 have the same absolute value and opposite signs. The input-side coefficients wF11 and wF17 are multiplied by the minute rotation durations T30(1) and T30(7), respectively, each corresponding to one of a pair of cylinders that reach compression top dead center in succession to each other. The minute rotation durations T30(1) and T30(7) are a set of the durations required to rotate by respective 30° CA angular intervals that are separated from each other by the angular interval between compression top dead center positions.

Figure 9:
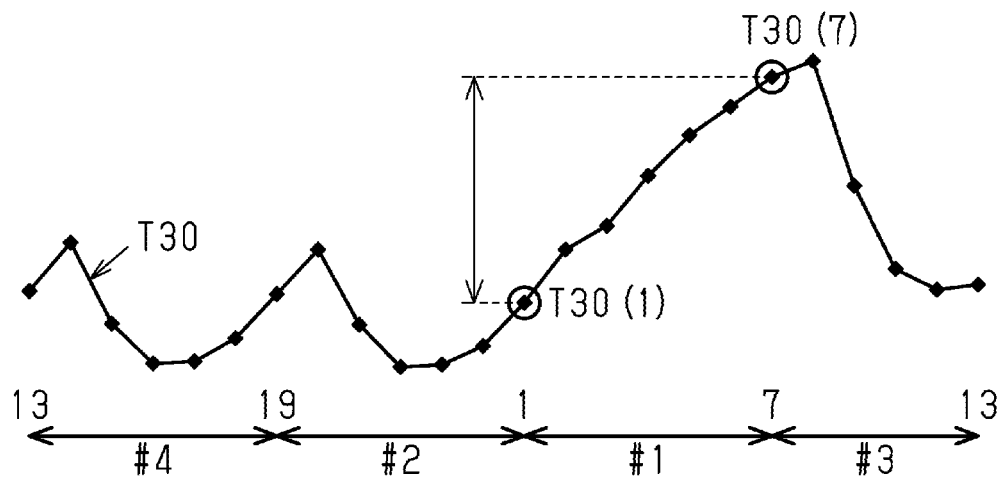
FIG. 9 is a timing chart showing how the minute rotation durations may vary when misfires occur in the misfire detection process shown in FIG. 7.

FIG. 9 shows the variation of the minute rotation durations T30 in a situation where a misfire has occurred in cylinder #1. As shown in FIG. 9, the angular intervals corresponding to the minute rotation durations T30(1) and T30(7) are set such that the difference between these durations has a large absolute value when cylinder #1 misfires. Specifically, the angular interval corresponding to the minute rotation duration T30(1) is set between compression top dead center of cylinder #2 and compression top dead center of cylinder #3, which occur before and after compression top dead center of cylinder #1. In addition, compression top dead center that is closest to the minute rotation duration T30(1) is compression top dead center of cylinder #1. Further, the angular interval corresponding to the minute rotation duration T30(7) is set between compression top dead center of cylinder #1 and compression top dead center of cylinder #4, which occur before and after compression top dead center of cylinder #3. In addition, compression top dead center that is closest to the minute rotation duration T30(7) is compression top dead center of cylinder #3, which reaches compression top dead center immediately after cylinder #1.

By setting the input-side coefficients wF11 and wF17 as described above, the term including wF11·{T30(1)−T30(7)} is included in the output of the linear mapping defined by wFlk to the intermediate layer. When a misfire occurs, the value of wF11·{T30(1)-T30(7)} will be negative and have a large absolute value. The present embodiment sets the output-side coefficients wSi1 to 0 except when i=1, so that only the torque reduction ratio Trq(1) of cylinder #1 reflects the information of T30(1)-T30(7). In a conventional misfire detection method, T30(1)-T30(7) corresponds to a parameter for determining whether cylinder #1 has misfired. As such, it is easy to understand that this value has a strong correlation with the torque reduction ratio Trq(1) of cylinder #1, in relation to physical events.

The input-side coefficients wFjk and the output-side coefficients wSij are set such that T30(7)-T30(13) is used to calculate the torque reduction ratio Trq(3) of cylinder #3, T30(13)-T30(19) is used to calculate the torque reduction ratio Trq(4) of cylinder #4, and T30(19)-T30(1) is used to calculate the torque reduction ratio Trq(2) of cylinder #2.

This is achieved by setting the initial values of the input-side coefficients wFjk and the output-side coefficients wSij so as to have the structure shown in FIG. 8, and by imposing constraints on the update of the input-side coefficients wFjk and the output-side coefficients wSij in the process corresponding to step S58 in FIG. 5 so as to maintain the configuration of FIG. 8. In place of the tolerance entropy, the present embodiment uses the square sum of the differences between the torque reduction ratios Trq(i) and the actual torque reduction ratios as an evaluation function used in updating the input-side coefficients wFjk and the output-side coefficients wSij.

Returning to FIG. 7, the CPU 72 obtains the probabilities P(1) to P(4) that misfires have occurred in respective cylinders #1 to #4 based on the torque reduction ratios Trq(i), the coolant temperature THW, and the intake air amount Ga (S70). Specifically, the storage device 76 stores map data shown in FIG. 10 that has torque reduction ratio Trq, intake air amount Ga, and coolant temperature THW as input variables and misfire probabilities P as output variables. The CPU 72 obtains probabilities P using this map data. The map data includes a group of discrete values of input variables and a group of values of output variables corresponding to respective input variable values. In this computation using the map data, when the value of an input variable matches any of the values of the input variable in the map data, the value of the corresponding output variable in the map data is output as a computation result. When the value of the input variable does not match any of the values of the input variable in the map data, a value obtained by interpolation of multiple values of the output variable in the map data is output as a computation result.

After step S70, the CPU 72 proceeds to step S18.

The mapping of the present embodiment clarifies the relationship between the torque reduction ratio and the difference between minute rotation durations T30 that are separated from each other by a specific phase in the time series data. This relationship is a strong correlation and easy to understand in relation to physical events. For this reason, as compared to a configuration that does not have any constraints on input-side coefficients wFjk or output-side coefficients wSij, the present embodiment is more helpful in understanding why the misfire probabilities are given values. This enables easier checking on the validity of the misfire probabilities given by the mapping.

Fourth Embodiment

A fourth embodiment will now be described with reference to FIG. 11. The differences from the first embodiment will mainly be discussed.

The present embodiment stores in the storage device 76 a plurality of types of mapping data as mapping data 76a. These different types of mapping data correspond to respective control modes.

Figure 11:
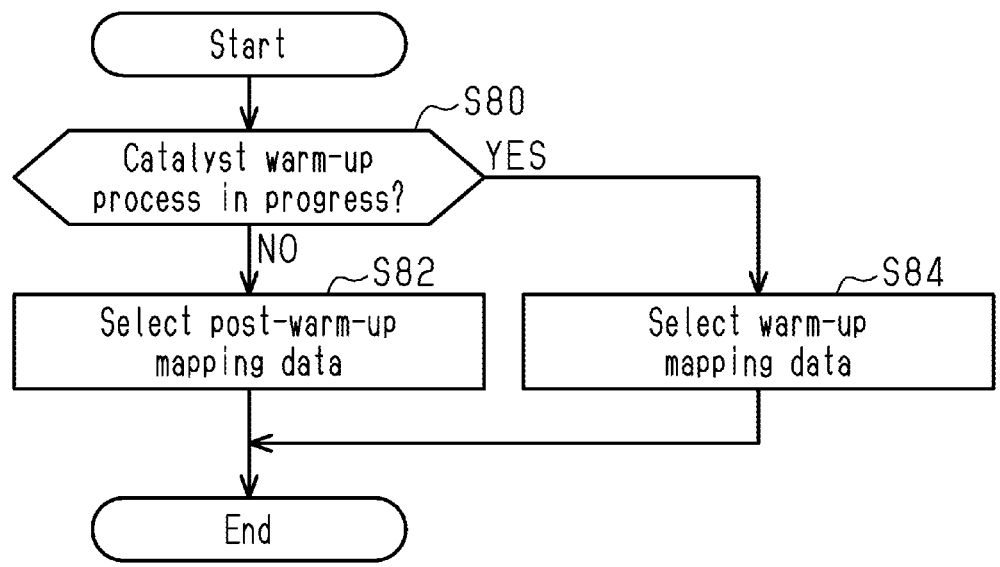
FIG. 11 is a flowchart showing the procedure of a mapping data selection process according to a fourth embodiment.

FIG. 11 shows the procedure of a process performed prior to the process shown in FIG. 2. To perform the process shown in FIG. 11, the CPU 72 may repeatedly execute the misfire detection program 74a stored in the ROM 74 in predetermined cycles.

In the process shown in FIG. 11, the CPU 72 determines whether a warm-up process of the three-way catalyst 30 is in progress (S80). The warm-up process includes retarding the ignition timing aig by a predetermined amount. The CPU 72 performs the warm-up process when a condition that the integrated value of the intake air amount Ga from the start of operation of the internal combustion engine 10 is less than or equal to a predetermined value, and a condition that the coolant temperature THW is less than or equal to a predetermined temperature are both satisfied.

When determining that the catalyst warm-up process is not in progress (S80: NO), the CPU 72 selects post-warm-up mapping data from the mapping data 76a stored in the storage device 76 (S82). Consequently, the CPU 72 uses the post-warm-up mapping data at step S16 to calculate probabilities P(i) that misfires have occurred. The post-warm-up mapping data is generated in the process shown in FIG. 5 using training data that is generated based on the detection values obtained by the sensor group 102 shown in FIG. 4 after the internal combustion engine 10 is warmed up.

When determining that the catalyst warm-up process is in progress at step S80 (S80: YES), the CPU 72 selects warm-up mapping data from the mapping data 76a stored in the storage device 76. (S84). The warm-up mapping data is generated using training data that is generated based on the detection values obtained by the sensor group 102 while the warm-up process of the internal combustion engine 10 is in progress.

After step S82 or S84, the CPU 72 ends the sequence shown in FIG. 11.

The operation and advantages of the present embodiment are now described.

To determine the presence or absence of misfires, the CPU 72 uses the warm-up mapping data when the warm-up process of the three-way catalyst 30 is in progress, and uses the post-warm-up mapping data when the warm-up process is not in progress. During the warm-up process of the three-way catalyst 30, the ignition timing aig is retarded, causing the rotational behavior of the crankshaft 24 to differ from that when the warm-up process is not in progress. If a single mapping is used to accurately calculate probabilities P of misfires, the input variables x should include data that allows assessing whether the warm-up process of the three-way catalyst 30 is in progress. This would increase the number of input-side coefficients wFjk, thereby requiring a large amount of training data. The two sampled values of intake air amount Ga and coolant temperature THW are not the only factors that determine whether the conditions for performing the warm-up process are satisfied. As such, in order to enable the assessment whether the warm-up process of the three-way catalyst 30 is in progress, an excessive number of dimensions would be required for input variables. Moreover, increased dimensions of input variables would lead to other requirements, such as increased intermediate layers in the neural network, resulting in a complex mapping structure and an increased computation load on the CPU 72. In contrast, the present embodiment, which uses different mapping data depending on whether warm-up is in progress or completed, can ensure the calculation accuracy of the probabilities P without excessively increasing the number of dimensions of the input variables x, allowing for a simple mapping structure.

Fifth Embodiment

A fifth embodiment will now be described with reference to FIG. 12. The differences from the first embodiment will mainly be discussed.

The present embodiment stores in the storage device 76 a plurality of types of mapping data as mapping data 76a. These different types of mapping data correspond to respective levels of the rotational speed NE.

Figure 12:
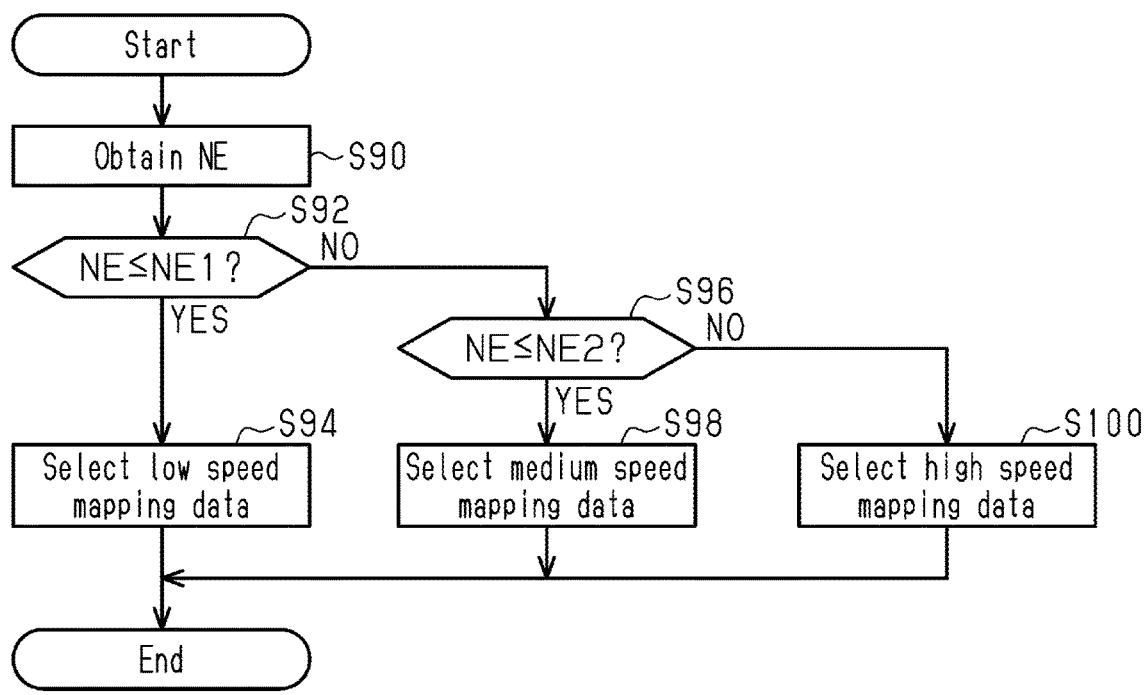
FIG. 12 is a flowchart showing the procedure of a mapping data selection process according to a fifth embodiment.

FIG. 12 shows the procedure of a process performed prior to the process shown in FIG. 2. To perform the process shown in FIG. 12, the CPU 72 may repeatedly execute the misfire detection program 74a stored in the ROM 74 in predetermined cycles.

In the process shown in FIG. 12, the CPU 72 first obtains the rotational speed NE (S90). The CPU 72 then determines whether the rotational speed NE is less than or equal to a low speed threshold NE1 (S92). When determining that the rotational speed NE is less than or equal to the low speed threshold NE1 (S92: YES), the CPU 72 selects low speed mapping data from the mapping data 76a stored in the storage device 76 (S94). Consequently, the CPU 72 uses the low speed mapping data at step S16 to calculate probabilities P(i) that misfires have occurred. The low speed mapping data is generated in the process shown in FIG. 5 using training data that is generated based on detection values obtained by the sensor group 102. These detection values are obtained while the dynamometer 100 or other device is operated in the system shown in FIG. 4 to create a state where the rotational speed NE is less than or equal to the low speed threshold NE1.

When determining that the rotational speed NE is greater than the low speed threshold NE1 (S92: NO), the CPU 72 determines whether the rotational speed NE is less than or equal to a medium speed threshold NE2 (S96). The medium speed threshold NE2 is set to a value greater than the low speed threshold NE1. When determining that the rotational speed NE is less than or equal to the medium speed threshold NE2 (S96: YES), the CPU 72 selects medium speed mapping data from the mapping data 76a stored in the storage device 76 (S98). The medium speed mapping data is generated using training data that is generated based on the detection values obtained by the sensor group 102 when the rotational speed NE of the internal combustion engine 10 is greater than the low speed threshold NE1 and less than or equal to the medium speed threshold NE2.

When determining that the rotational speed NE is greater than the medium speed threshold NE2 (S96: NO), the CPU 72 selects high speed mapping data from the mapping data 76a stored in the storage device 76 (S100). The high speed mapping data is generated using training data that is generated based on the detection value obtained by the sensor group 102 when the rotational speed NE of the internal combustion engine 10 is greater than the medium speed threshold NE2.

After step S94, S98 or S100, the CPU 72 ends the sequence shown in FIG. 12

The present embodiment selects different mapping data depending on the rotational speed NE, so that appropriate mapping data can be used according to the rotational speed NE. As compared to a configuration in which common mapping data is used regardless of the level of rotational speed NE, the present embodiment improves the calculation accuracy of probabilities P with a simple mapping structure.

Sixth Embodiment

A sixth embodiment will now be described with reference to FIG. 13. The differences from the first embodiment will mainly be discussed.

The present embodiment stores in the storage device 76 a plurality of types of mapping data as mapping data 76a. These different types of mapping data correspond to respective shift positions Sft.

Figure 13:
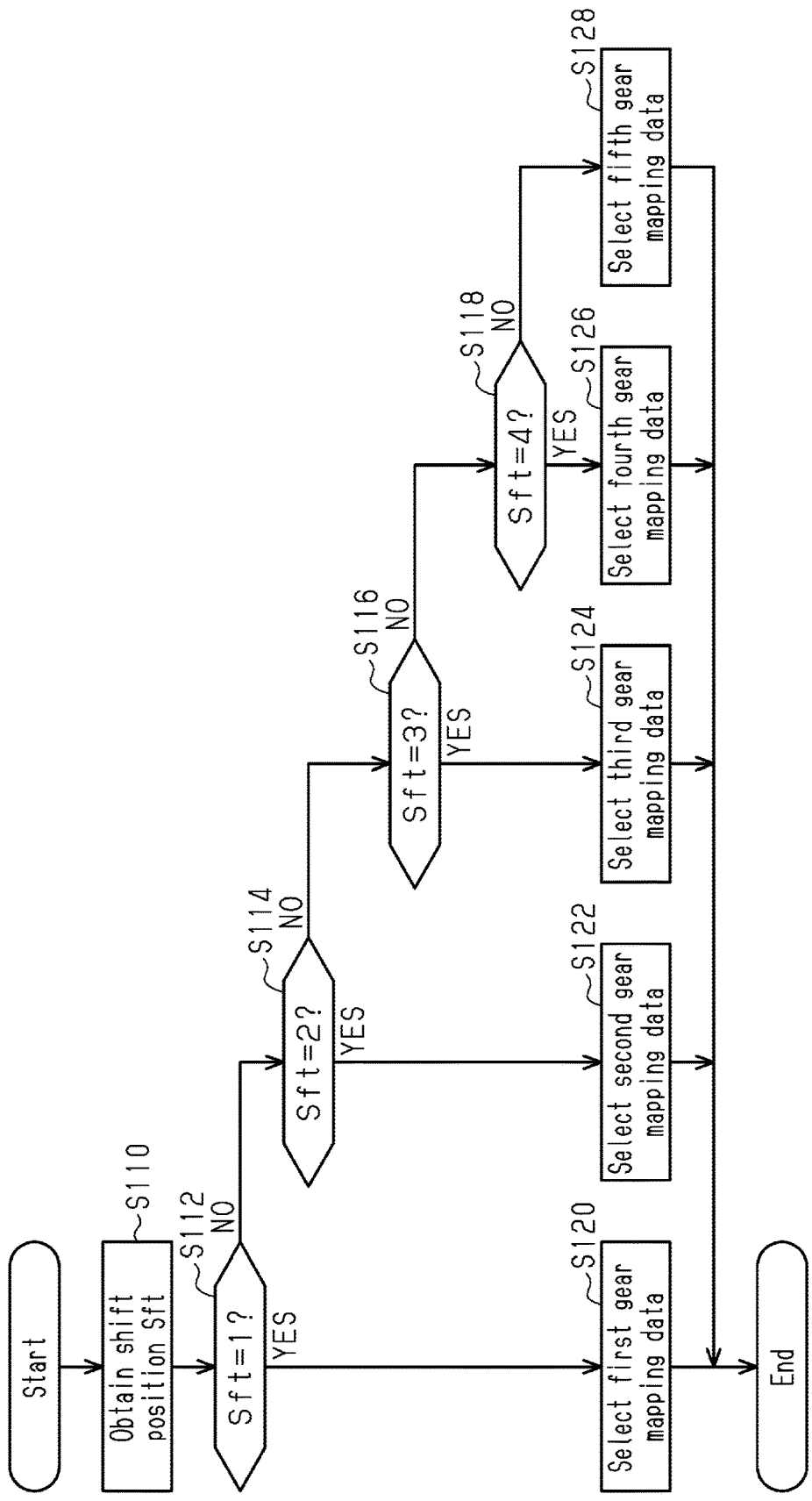
FIG. 13 is a flowchart showing the procedure of a mapping data selection process according to a sixth embodiment.

FIG. 13 shows the procedure of a misfire detection process according to the present embodiment. To perform the process shown in FIG. 13, the CPU 72 may repeatedly execute the misfire detection program 74a stored in the ROM 74 in predetermined cycles.

In the process shown in FIG. 13, the CPU 72 first obtains the shift position Sft (S110). The CPU 72 then determines whether the shift position Sft is first gear (S112), second gear (S114), third gear (S116), or fourth gear (S118). When determining that the shift position Sft is first gear (S112: YES), the CPU 72 selects first gear mapping data from the mapping data 76a stored in the storage device 76 (S120). Consequently, the CPU 72 uses the first gear mapping data at step S16 to calculate probabilities P(i) that misfires have occurred. In a similar manner, the CPU 72 selects second gear mapping data (S122) when determining that the shift position Sft is second gear (S114: YES), selects third gear mapping data (S124) when determining that the shift position Sft is third gear (S116: YES), and selects fourth gear mapping data (S126) when determining that the shift position Sft is fourth gear (S118: YES). When determining that the shift position Sft is fifth gear (S118: NO), the CPU 72 selects fifth gear mapping data (S128).

Assuming that the variable α can take 1 to 5, α-th gear mapping data is generated in the process shown in FIG. 5 using training data that is generated based on the detection values obtained by the sensor group 102 shown in FIG. 4 when the transmission 64 is in the α-th gear.

After step S120, S122, S124, S126 or S128, the CPU 72 ends the sequence shown in FIG. 13.

Different shift positions Sft result in different inertia constants from the crankshaft 24 to the drive wheels 69 and thus different rotational behaviors of the crankshaft 24. The present embodiment, which uses different mapping data depending on the shift position Sft, accommodates this difference properly in determining the presence or absence of misfires. As compared to a configuration that uses a single mapping for all shift positions Sft, the present embodiment improves the calculation accuracy of probabilities P with a simple mapping structure.

Seventh Embodiment

A seventh embodiment will now be described with reference to FIG. 14. The differences from the first embodiment will mainly be discussed.

The present embodiment stores in the storage device 76 a plurality of types of mapping data as mapping data 76a. These different types of mapping data correspond to respective levels of the road surface state.

Figure 14:
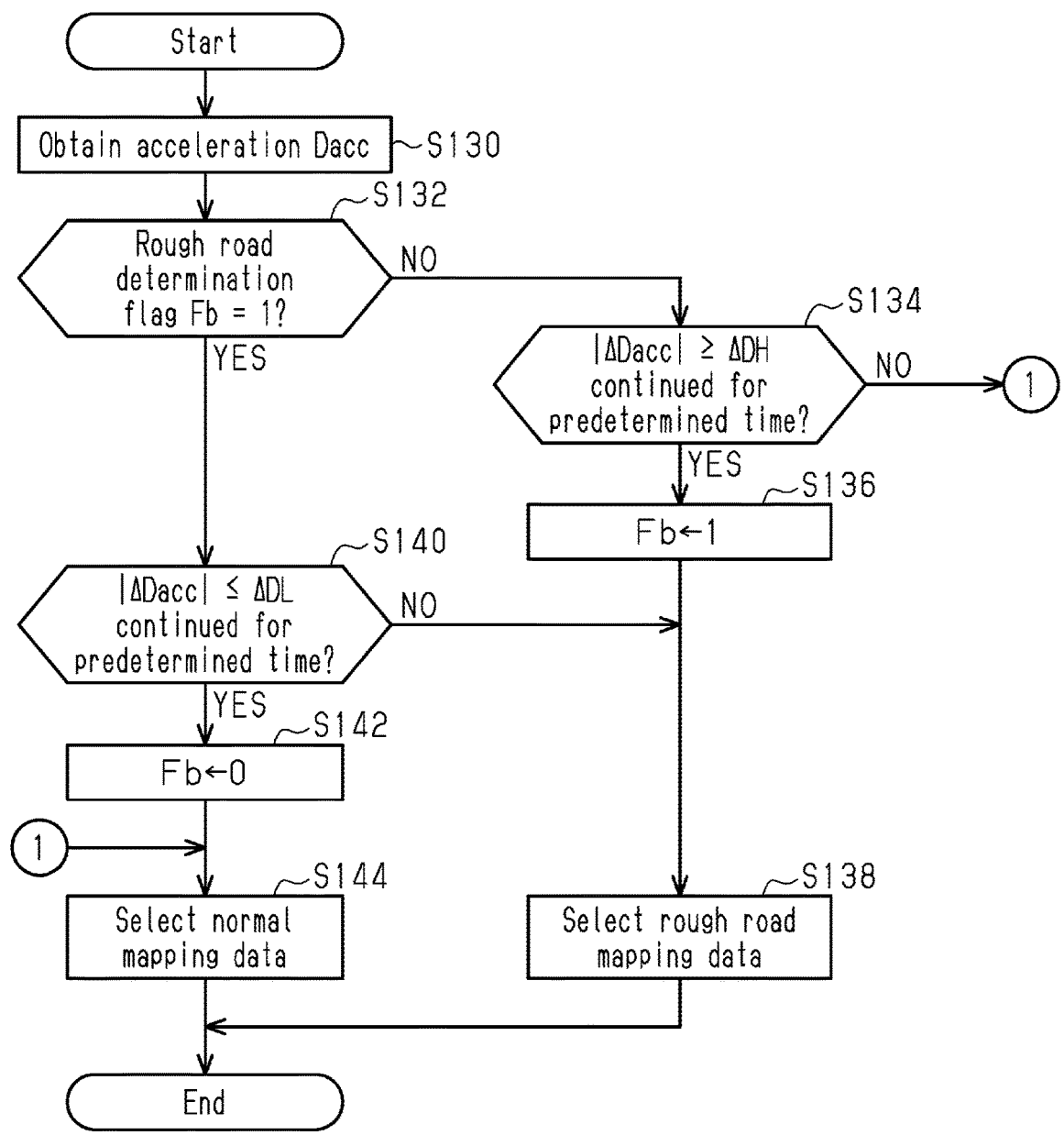
FIG. 14 is a flowchart showing the procedure of a mapping data selection process according to a seventh embodiment.

FIG. 14 shows the procedure of a process performed prior to the process shown in FIG. 2. To perform the process shown in FIG. 14, the CPU 72 may repeatedly execute the misfire detection program 74a stored in the ROM 74 in predetermined cycles.

In the process shown in FIG. 14, the CPU 72 first obtains the acceleration Dacc (S130). The CPU 72 then determines whether the rough road determination flag Fb is 1 (S132). The rough road determination flag Fb is 1 if the road surface on which the vehicle VC is traveling is rough, and 0 if not. When determining that the rough road determination flag Fb is 0 (S132: NO), the CPU 72 then determines whether a state in which the absolute value of the change amount of the acceleration Dacc is greater than or equal to a predetermined value ΔDH has continued for a predetermined time (S134). The change amount of the acceleration Dacc may be the difference between the previous value and the current value of the acceleration Dacc. This step determines whether the road surface is rough. When determining that a state in which the absolute value of the change amount of the acceleration Dacc is greater than or equal to the predetermined value ΔDH has continued for the predetermined time (S134: YES), the CPU 72 assigns 1 to the rough road determination flag Fb (S136) and selects rough road mapping data from the mapping data 76a stored in the storage device 76 (S138). Consequently, the CPU 72 uses the rough road mapping data at step S16 to calculate probabilities P(i) that misfires have occurred. The rough road mapping data is generated in the process shown in FIG. 5 using training data that is generated based on detection values obtained by the sensor group 102 shown in FIG. 4. These detection values are obtained while the load torque that acts on the crankshaft 24 when the vehicle vibrates is simulated in a similar manner as the method used in the second embodiment.

When determining that the rough road determination flag Fb is 1 (S132: YES), the CPU 72 determines whether a state in which the absolute value of the change amount of the acceleration Dacc is less than or equal to a specified value ΔDL (<ΔDH) has continued for the predetermined time (S140). If the outcome is negative at step S140 (S140: NO), the CPU 72 proceeds to step S138.

When determining that a state in which the absolute value of the change amount of the acceleration Dacc is less than or equal to the specified value ΔDL has continued for the predetermined time (S140: YES), the CPU 72 assigns 0 to the rough road determination flag Fb (S142). When completing step S142 or determining that the outcome is negative at step S134, the CPU 72 selects normal mapping data from the mapping data 76a (S144). The normal mapping data is generated in the process shown in FIG. 5 using training data that is generated based on detection values obtained by the sensor group 102 shown in FIG. 4. These detection values are obtained while no intentional vibration is applied to the internal combustion engine 10 or the dynamometer 100 shown in FIG. 4.

After step S138 or S144, the CPU 72 ends the sequence shown in FIG. 14.

Different road surface states result in different rotational behaviors of the crankshaft 24. The present embodiment, which uses different mapping data depending on the road surface state, accommodates this difference properly in determining the presence or absence of misfires. As compared to a configuration that uses a single mapping for all road surface states, the present embodiment improves the calculation accuracy of probabilities P with a simple mapping structure.

Eighth Embodiment

An eighth embodiment will now be described with reference to FIG. 15. The differences from the first embodiment will mainly be discussed.

As mapping data 76a, the present embodiment stores in the storage device 76 a mapping data set that defines a mapping that outputs a probability that a misfire has occurred in one cylinder in one combustion cycle, and a mapping data set that defines a mapping that outputs a probability that misfires have occurred in two cylinders in one combustion cycle.

Figure 15:
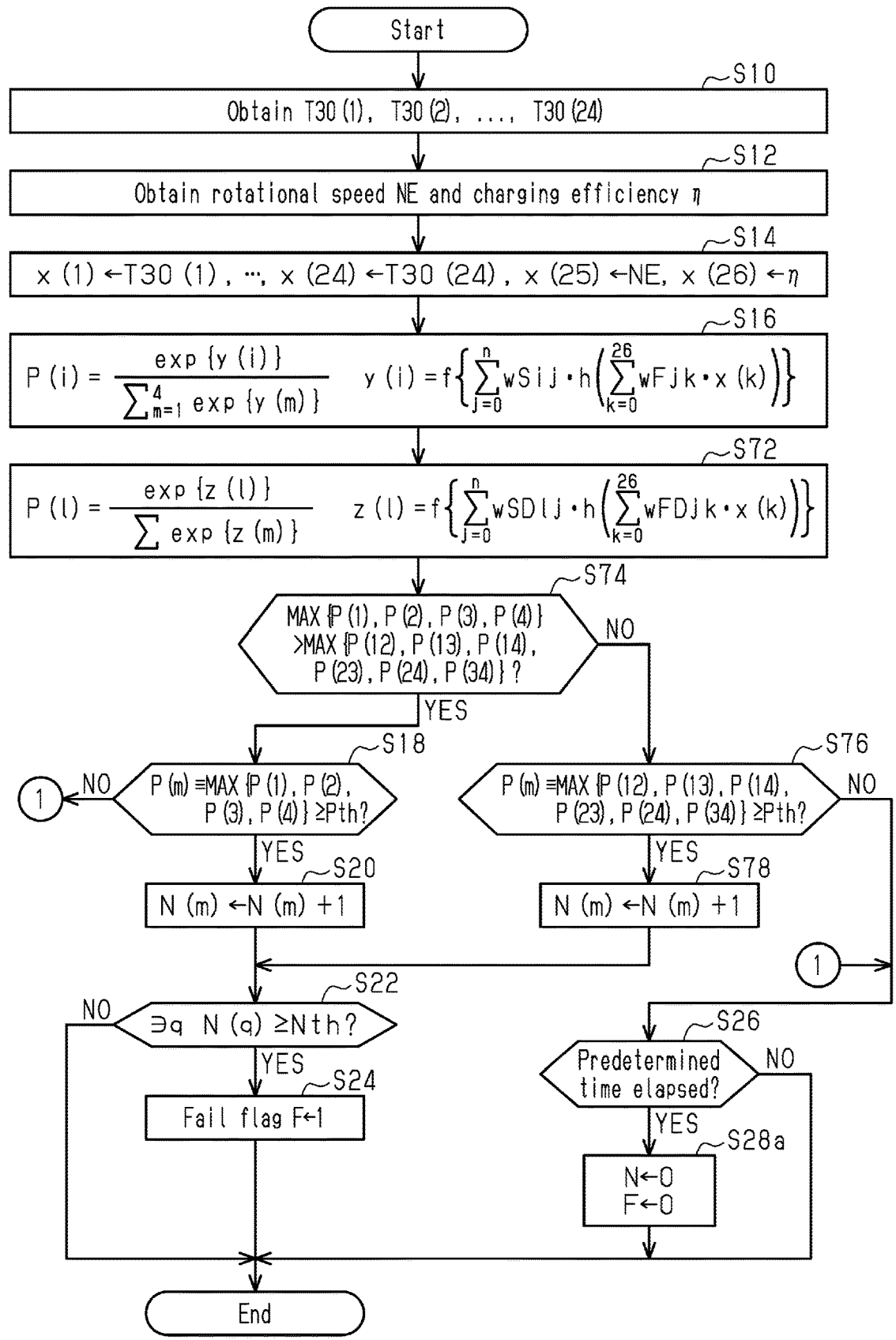
FIG. 15 is a flowchart showing the procedure of a misfire detection process according to an eighth embodiment.

FIG. 15 shows the procedure of a misfire detection process according to the present embodiment. To perform the process shown in FIG. 15, the CPU 72 may repeatedly execute the misfire detection program 74a stored in the ROM 74 in predetermined cycles. The same step numbers are given to the steps in FIG. 15 that correspond to steps shown in FIG. 2. Such steps will not be described in detail.

In the process shown in FIG. 15, after step S16, the CPU 72 inputs input variables $x(1)$ to $x(26)$ to the mapping that outputs probabilities that misfires have occurred in two cylinders in one combustion cycle. The CPU 72 thus calculates the probabilities $P(1)$ that misfires have occurred in two cylinders (S72). Here, the variable 1 of $P(1)$ (1 is the lowercase letter of L) is a variable that specifies a pair of two cylinders. The value of the variable 1 that represents that misfires have occurred in cylinders #1 and #2 is 12. The variable 1 can take 12, 13, 14, 23, 24, and 34.

In the present embodiment, this mapping includes a neural network, which includes one intermediate layer, and the softmax function. The softmax function is used to normalize the outputs of the neural network so that the probabilities $P(12)$ to $P(34)$ of misfires add up to 1. The neural network includes input-side coefficients wFDjk (j=0 to n, k=0 to 26) and activation functions $h(x)$. The input-side coefficients wFDjk define input-side linear mappings, and the activation functions $h(x)$ are input-side nonlinear mappings that perform nonlinear transformation on the output of the respective input-side linear mappings. In the present embodiment, the hyperbolic tangent is used as the activation function $h(x)$. The neural network also includes output-side coefficients wSDlj (j=0 to n) and activation functions $f(x)$. Here, 1 in wSDlj is the lowercase letter of L. The output-side coefficients wSDlj define output-side linear mappings, and the activation functions $f(x)$ are output-side nonlinear mappings that perform nonlinear transformation on the output of the respective output-side linear mappings. In the present embodiment, the hyperbolic tangent is used as the activation function $f(x)$. The value n indicates the number of dimensions in the intermediate layer. In the present embodiment, the value n is smaller than the number of dimensions (26 dimensions in this example) of the input variables x. Input-side coefficients wFDj0 are bias parameters and used as coefficients for input variable $x(0)$, which is defined as 1 (the Arabic numeral one). Output-side coefficients wSDl0 (1 is the lowercase letter of L) are bias parameters and multiplied by 1. For example, this may be achieved by defining that wFD00·x(0)+wFD01·x(1)+ . . . is identically infinite.

After step S72, the CPU 72 determines whether the maximum value of the probabilities $P(1)$ to $P(4)$ is greater than the maximum value of the probabilities $P(12)$, $P(13)$, $P(14)$, $P(23)$, $P(24)$, and $P(34)$ (S74). This step determines whether the probability that a misfire has occurred in one cylinder in one combustion cycle is greater than the probability that misfires have occurred in two cylinders. If the outcome at step S74 is affirmative, the CPU 72 proceeds to step S18. If the outcome is negative, the CPU 72 determines whether the maximum value $P(m)$ of the probabilities $P(12)$, $P(13)$, $P(14)$, $P(23)$, $P(24)$ and $P(34)$ is greater than or equal to a threshold value Pth (S76). Here, the variable m can take 12, 13, 14, 23, 24, and 34. This step determines whether misfires have occurred in two cylinders. When determining that the maximum value $P(m)$ is greater than or equal to the threshold value Pth (S76: YES), the CPU 72 increments the number $N(m)$ of misfire events in the pair of cylinders corresponding to the probability $P(m)$ (S78).

After step S78, the CPU72 proceeds to step S22. If the outcome is negative at step S76, the CPU 72 proceeds to step S26. If the outcome at step S26 is affirmative, the CPU 72 resets the numbers $N(12)$, $N(13)$, $N(14)$, $N(23)$, $N(24)$, and $N(34)$ in addition to numbers $N(1)$ to $N(4)$, and also resets the fail flag F (S28a). In the present embodiment, the predetermined time used in step S26 starts at the time point when step S24 or S28a is performed.

The present embodiment uses different map data depending on the type of misfires and thus improves the accuracy of misfire determination with a simple map structure. That is, when misfires occur in two cylinders in one combustion cycle, the earlier misfire may affect the rotational behavior of the crankshaft 24 before the subsequent misfire occurs. As such, if a single mapping is used to accurately determine both of the case where a misfire occurs in only one cylinder in one combustion cycle and the case where misfires occur in two cylinders, this single mapping would need to satisfy many requirements, resulting in a complex mapping structure. The present embodiment avoids such complexity and uses a simple mapping structure.

Ninth Embodiment

A ninth embodiment will now be described with reference to FIGS. 16 and 17. The differences from the first embodiment will mainly be discussed.

The present embodiment performs determination of misfires outside the vehicle.

Figure 16:
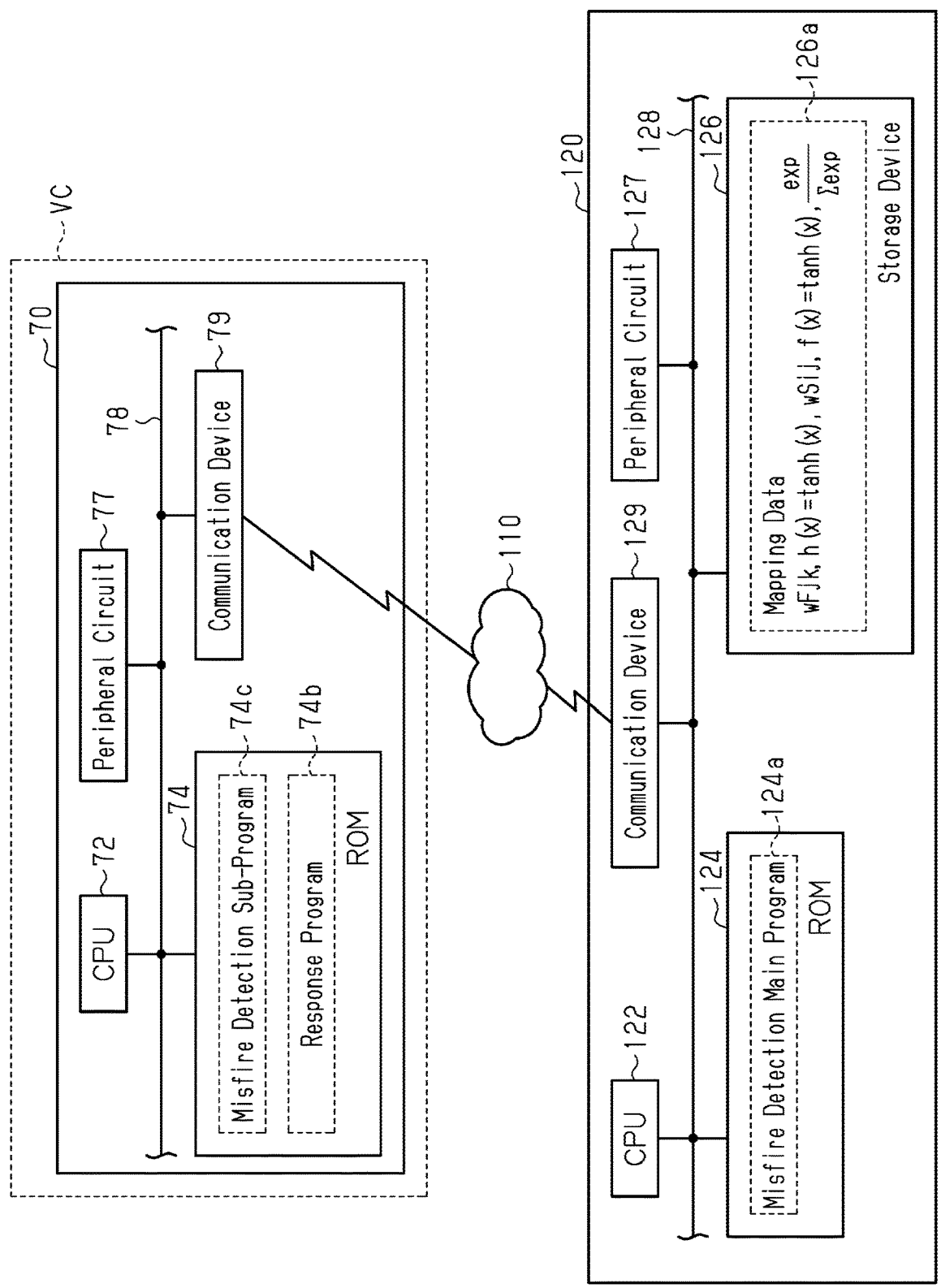
FIG. 16 is a diagram showing the configuration of a misfire detection system according to a ninth embodiment.

FIG. 16 shows a misfire detection system according to the present embodiment. In FIG. 16, the same reference numerals are given to those components that are the same as the corresponding components shown in FIG. 1.

The controller 70 in the vehicle VC shown in FIG. 16 includes a communication device 79, which communicates with a center 120 via a network 110 outside the vehicle VC.

The center 120 analyzes data transmitted from a plurality of vehicles VC. The center 120 includes a CPU 122, a ROM 124, a storage device 126, peripheral circuits 127, and a communication device 129, which can communicate with one another via a local network 128. The ROM 124 stores a misfire detection main program 124a, and the storage device 126 stores mapping data 126a. The mapping data 126a is the same as the mapping data 76a.

Figure 17:
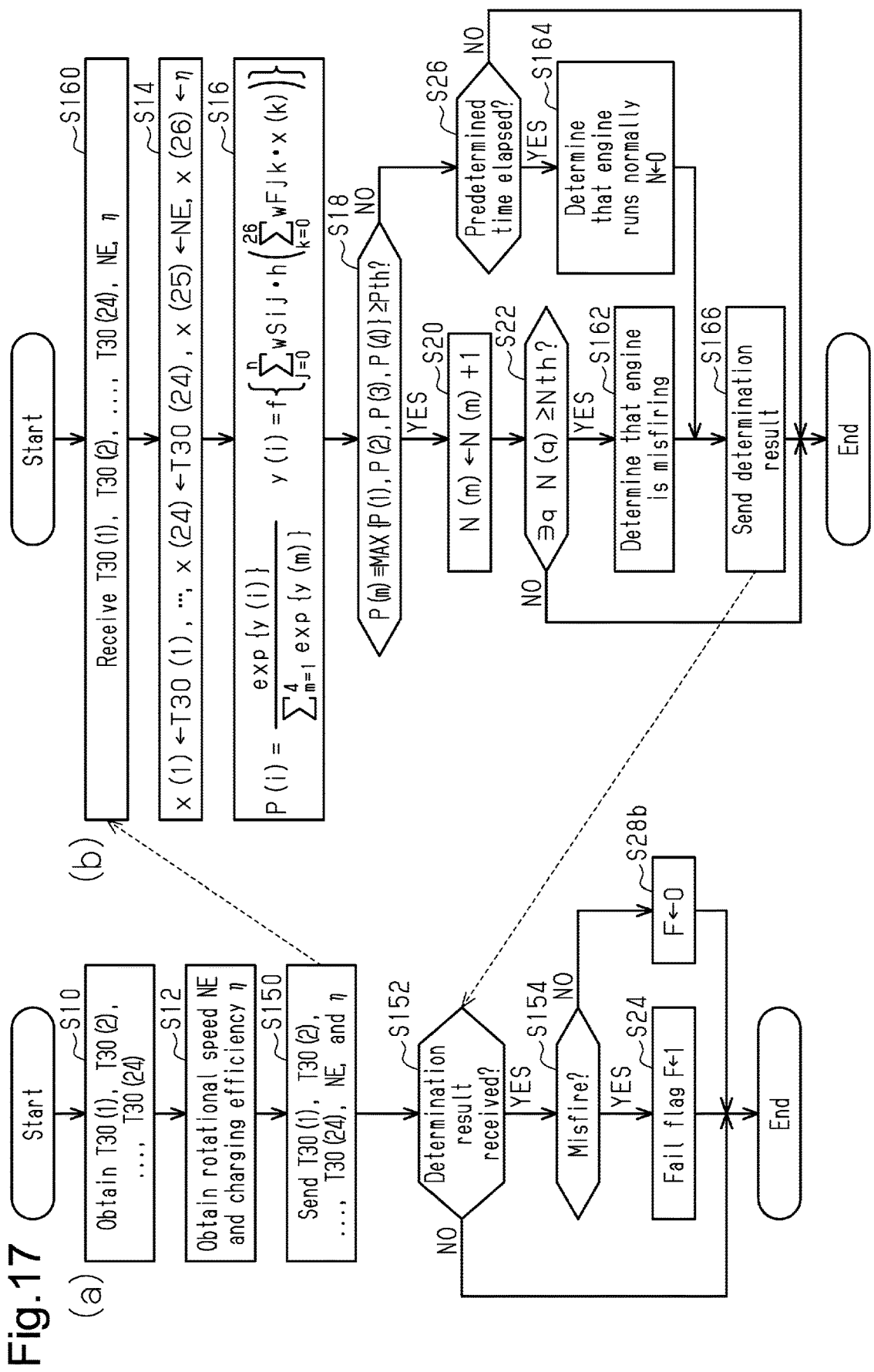
FIG. 17 is a flowchart including section (a) and section (b) and showing the procedure of processes performed by the misfire detection system of FIG. 16.

FIG. 17 shows the procedure of a misfire detection process according to the present embodiment. The process shown in section (a) in FIG. 17 is performed by the CPU 72 by repeatedly executing a misfire detection sub-program 74c stored in the ROM 74 shown in FIG. 16. The process shown in section (b) in FIG. 17 is performed by the CPU 122 by executing a misfire detection main program 124a stored in the ROM 124. The same step numbers are given to the steps in FIG. 17 that correspond to steps shown in FIG. 2. The process shown in FIG. 17 is now described in chronological order of the misfire detection process.

After performing steps S10 and S12 shown in section (a) in FIG. 17, the CPU 72 in the vehicle VC operates the communication device 79 to transmit the data obtained at steps S10 and S12 to the center 120 together with the identification information of the vehicle VC (S150).

As shown in section (b) in FIG. 17, the CPU 122 in the center 120 receives the transmitted data (S160) and repeats the process from S14 to S20 using the received data. While repeating steps S14 to S20, the CPU 122 determines that misfires are occurring (S162) when determining that the number of misfire events in a certain cylinder has reached a predetermined number Nth within a predetermined time in the same vehicle specified with its identification information (S22: YES). If the number of misfires events does not reach the predetermined number Nth in any cylinder after steps S14 to S20 are repeated over the predetermined time (S22: NO, S26: YES), the CPU 122 determines that the internal combustion engine 10 runs normally and resets the numbers N(1) to N(4) (S164). The predetermined time in this process starts at the time point when step S162 or S164 is performed.

After step S162 or S164, by referring to the identification information, the CPU 122 operates the communication device 129 to send a signal regarding the determination result to the vehicle VC that has sent the data on which the process of S14 to S20 is performed (S166). If it is determined that misfires have occurred, the information on the determination result includes the information on the misfiring cylinder. When completing step S166 or determining that the outcome is negative at step S22 or S26, the CPU 122 ends the sequence of section (b) in FIG. 17.

As shown in section (a) in FIG. 17, when receiving the signal regarding the determination result sent from the center 120 (S152: YES), the CPU 72 in the vehicle VC determines whether the determination result indicates that misfires have occurred (S154). If the determination result indicates that misfires have occurred (S154: YES), the CPU 72 proceeds to step S24. If the determination result indicates that no misfire has occurred (S154: NO), the CPU 72 resets the fail flag F (S28b).

When completing step S24 or S28b or determining that the outcome is negative at step S152, the CPU 72 ends the sequence of section (a) in FIG. 17.

The present embodiment performs the misfire determination process in the center 120, thereby reducing the computation load on the controller 70.

<Correspondence>

The correspondence between the items in the above embodiments and the items described in the above SUMMARY is as follows. Below, the correspondence is shown for each of the numbers in the examples described in the above SUMMARY.

[1] The misfire detection device corresponds to the controller 70. The execution device corresponds to the CPU 72 and the ROM 74. The storage device corresponds to the storage device 76. The first interval corresponds to 720° CA, the second interval corresponds to 30° CA, and the instantaneous speed parameters correspond to the minute rotation durations T30. The obtainment process corresponds to step S10. The determination process corresponds to steps S16 to S28 in FIG. 2, steps S16a and S18 to S28 in FIG. 6, steps S16b, S70 and S18 to S28 in FIG. 7, and steps S16 to S26, S28a and S72 to S78 in FIG. 15. The response process corresponds to the process shown in FIG. 3 (S32 to S46).

[2] The parameter that defines the operating point corresponds to the rotational speed NE and the charging efficiency η.

[3] The moderator variable corresponds to the ignition timing aig, the target value Af*, and the EGR ratio Regr.

[4] The state variable of the driveline system corresponds to the shift position Sft.

[5] The road surface state variable corresponds to the state variable SR.

[6] The selection process corresponds to the processes shown in FIGS. 11 to 14.

[7] The determination process corresponds to steps S16 to S26, S28a and S72 to S78 in FIG. 15.

[8] The input-side mapping data corresponds to data on the input-side coefficients wFjk and data on the activation functions h(x), and data on the input-side coefficients wFDjk and data on the activation functions h(x). The output-side mapping data corresponds to data on the output-side coefficients wSij and data on the activation functions f(x), and data on the output-side coefficients wSDlj and data on the activation functions f(x).

[9] The torque output mapping corresponds to the mapping defined by the data on the output-side coefficients wSij and the data on the activation function f(x) in FIG. 7. The probability mapping corresponds to the mapping defined by the map data shown in FIG. 10. The data on generated torque corresponds to torque reduction ratios Trq. The torque calculation process corresponds to step S16b. The probability calculation process corresponds to step S70.

[10] The "plurality of input-side linear mappings that output linear combination data" corresponds to n linear mappings defined by the respective input-side coefficients wF1k, wF2k, . . . , wFnk. That is, the linear mapping that is defined by the input-side coefficients wFjk and gives outputs of n dimensions can be considered as n linear mappings each give an output of one dimension. "At least one coefficient" corresponds to wF11 and wF17 in the example in FIG. 8. The "output-side nonlinear mapping that is associated with one of the pair of cylinders" corresponds to the activation function f(x) that outputs Trq(1) in the example in FIG. 8.

[11] The notification device corresponds to the warning light 90.

[12] The operation portion (the combustion operation portion) corresponds to the intake variable valve timing system 40, the ignition devices 22, the fuel injection valves 20, and the throttle valve 14.

[13] The first execution device corresponds to the CPU 72 and the ROM 74. The second execution device corresponds to the CPU 122 and the ROM 124. The output calculation process corresponds to step S16 in FIG. 17. The "signal based on the output calculated in the output calculation process" corresponds to a signal regarding a determination result.

[14] The data analysis device corresponds to the center 120.

[15] The controller for an internal combustion engine corresponds to the controller 70 shown in FIG. 16.

OTHER EMBODIMENTS

The above-described embodiments may be modified as follows. The above-described embodiments and the following modifications can be combined as long as the combined modifications remain technically consistent with each other.

Regarding First Interval and Second Interval

The embodiments described above use the minute rotation durations T30 as input parameters of the mapping for determining the presence or absence of misfires. Each minute rotation duration T30 is an instantaneous speed parameter corresponding to one of successive second intervals within a 720° CA rotational angular interval, which corresponds to one combustion cycle. In the embodiments described above, the first interval is 720° CA and the second interval is 30° CA. However, the present disclosure is not limited to this. For example, the first interval may be a rotational angular interval greater than 720° CA. Further, the first interval does not have to be greater than or equal to 720° CA. For example, the first interval may be less than or equal to 720° CA, such as 480° CA, for the inputs to a mapping that outputs a probability of misfire or the data on generated torque for a specific cylinder, as will be described in "Regarding Plurality of Types of Mapping Data" below. In this case, the first interval is preferably greater than the rotational angular interval between compression top dead center positions. In addition, the first interval should include compression top dead center of the cylinder for which the mapping outputs a probability of misfire.

The second interval is not limited to 30° CA. For example, the angular interval may be smaller than 30°, such as 10°. Further, the second interval does not have to be less than or equal to 30° and may be 45°, for example.

Regarding Instantaneous Speed Parameter

The instantaneous speed parameter is not limited to the minute rotation duration, which is the time required for rotation by the second interval. For example, the instantaneous speed parameter may be a value obtained by dividing the second interval by the minute rotation duration. The instantaneous speed parameter does not have to be obtained using the process that normalizes values so that the difference between the local maximum (maximum value) and the local minimum (minimum value) is a fixed value. The filtering performed as pre-processing for the instantaneous speed parameters as inputs to the mapping is not limited to the example described above. For example, the instantaneous speed parameters may be subjected to a process that removes the influence of the input shaft 66 of the transmission 64 on the rotation of the crankshaft 24, based on the minute rotation durations of the input shaft 66. Nevertheless, it is not necessary to perform filtering on the instantaneous speed parameters to be used as mapping inputs.

Regarding Parameters Defining Operating Point of Internal Combustion Engine

In the embodiment described above, the operating point is defined by the rotational speed NE and charging efficiency η, but the present disclosure is not limited to this. For example, the rotational speed NE and intake air amount Ga may be used. Further, instead of the charging efficiency η, the injection amount or the required torque for the internal combustion engine may be used as a load. Using the injection amount or the required torque as a load is particularly effective in a compression ignition internal combustion engine, which will be described in "Regarding Internal Combustion Engine" below.

Regarding Moderator Variable for Controlling Combustion Speed of Air-Fuel Mixture as Mapping Input The process of FIG. 6 uses the target value Af* as a moderator variable that controls the combustion speed and is input to the mapping. Instead, the process may use the detection value of the air-fuel ratio sensor as the air-fuel ratio. The process of FIG. 6 uses ignition timing aig, air-fuel ratio, and EGR ratio as moderator variables that control the combustion speed and are input to the mapping. However, the process may use only one or two of these three parameters. Further, when the process is performed for a compression ignition internal combustion engine, as will be described in "Regarding Internal Combustion Engine" below, the injection timing may be used instead of the ignition timing aig. Further, the process may use the required injection amount Qd and charging efficiency η, instead of the air-fuel ratio.

The moderator variables that control the combustion speed and are input to the mapping are not limited to the parameters described above, and may be the valve opening timing or lift amount of the intake valves 16 and the valve opening timing or lift amount of the exhaust valves 26. Alternatively, when cylinder deactivation control is performed to stop combustion of air-fuel mixture in some of the cylinders, the information on the deactivated cylinders may be used. In addition, when the internal combustion engine 10 includes a forced-induction device and a wastegate, the opening degree of the wastegate may be used.

Regarding State Variable of Driveline System as Mapping Input

The process of FIG. 6 uses the shift position Sft as the state variable of the driveline system connected to the crankshaft 24, but the present disclosure is not limited to this. For example, the process may use the state of the lockup clutch 62. This state variable may be a binary variable that represents the engaged state and the released state. Alternatively, the state variable may represent the engaged state, the released state, and the slip state.

Further, the state variable of the driveline system may be the oil temperature of the transmission 64, or the rotational speed of the drive wheels 69. When the vehicle includes the internal combustion engine 10 and a motor-generator as devices for generating thrust, as will be described in "Regarding Vehicle" below, the state variable may be the torque or rotational speed of the motor-generator. Further, more than one state variable of the driveline system may be input to the mapping.

Regarding Road Surface State Variable as Mapping Input

The road surface state variable SR is not limited to a binary variable representing levels of the road roughness, and may be a variable that can take three or more values representing levels of the roughness. The method for generating the state variable SR based on the acceleration Dacc is not limited to the method illustrated in FIG. 14. Instead, the average of the absolute values of the acceleration Dacc measured in a predetermined period may be used. In this case, the state variable SR is a continuous variable.

Values other than the detected value of vertical acceleration of the vehicle VC may be used to quantify the road surface state into the road surface state variable SR. The road surface state may be quantified based on the lateral acceleration or the acceleration in the front-rear direction of the vehicle. Furthermore, as an input to the mapping, the road surface state may be quantified based on any two or all of the three accelerations in the vertical, lateral, and front-rear directions of the vehicle.

In the process of FIG. 6, the road surface state is quantified into the road surface state variable SR based on the acceleration Dacc detected by the acceleration sensor 88. However, the present disclosure is not limited to this. For example, the road surface state may be quantified using the data on results of analysis of the image data of road surface captured with a camera or the data on reflected radar waves. Alternatively, map data including road surface states and the GPS may be used to obtain the state of the road surface at the current location, which may be used as the road surface state variable SR. The process may also use the air pressure of each wheel. That is, the difference between the air pressures of the wheels includes information on the road surface inclination or unevenness. Alternatively, the process may use the detection value of a sensor that detects the position of the fluid level in the vehicle, such as a fuel gauge or an oil gauge. The fluid level fluctuation provides information on the road surface unevenness, for example. Further, the process may use the detection value of a sensor that detects the hydraulic pressure of the suspension. The hydraulic pressure provides information on the road surface unevenness, for example.

States other than road surface unevenness may be quantified into a road surface state variable. For example, the level of friction of the road surface, such as the presence or absence of ice, may be quantified. Further, the variable may represent both roughness and the level of friction of the road surface.

Regarding Mapping Inputs

Parameters used as inputs to the mapping in addition to the instantaneous speed parameters are not limited to those used in the embodiments and modifications described above. For example, parameters relating to the environment in which the internal combustion engine 10 is placed may be used. Specifically, the mapping may use the atmospheric pressure, which is a parameter that affects the proportion of oxygen in the intake air. The mapping may use the intake air temperature, which is a parameter that affects the combustion speed of the air-fuel mixture in the combustion chambers 18. Further, the mapping may use the humidity, which is a parameter that affects the combustion speed of the air-fuel mixture in the combustion chambers 18. The humidity may be identified using a humidity sensor, or from the detection value of a sensor that detects the state of the wiper or raindrop. The mapping may also use data on the state of an auxiliary device mechanically connected to the crankshaft 24.

The inputs to the mapping do not have to include the operating point of the internal combustion engine 10. For example, it is not necessary to include the operating point when the internal combustion engine is mounted on a series hybrid vehicle, which will be described in "Regarding Internal Combustion Engine" below, and the operating point is controlled within a narrow range.

Further, only one of the two parameters defining the operating point, which may be rotational speed NE and load, or rotational speed NE and intake air amount, may be input to the mapping in addition to the instantaneous speed parameters.

Regarding Mapping Data for Each Control Mode

In the example shown in FIG. 11, different mapping data is provided for each of the control mode used during warm-up of the three-way catalyst 30 and the control mode used after warm-up. However, the present disclosure is not limited to this. For example, when the internal combustion engine includes both port injection valves and direct injection valves, as will be described in "Regarding Internal Combustion Engine" below, different mapping data may be provided for each of the mode in which fuel injection control uses only the port injection valves and the mode in which fuel injection control uses the direct injection valves.

Regarding Mapping Data for Each Level of State Variable of Internal Combustion Engine as Result of Control The example shown in FIG. 12 includes three types of mapping data for respective levels of the rotational speed NE, but two or four types of data may be used.

The mapping data for each level of state variable of the internal combustion engine 10 as a result of control, which is set in recognition that the state variable of the internal combustion engine 10 is a result of control, is not limited to the mapping data for each level of the rotational speed NE shown in FIG. 12. For example, different data may be provided for each level of the charging efficiency η. Further, different data may be provided for each level of the operating point of the internal combustion engine 10, such as each level of the rotational speed NE and charging efficiency η.

Regarding Mapping Data for Each Level of State Variable of Driveline System

For example, as will be described in "Other Modification" below, when the transmission is a continuously variable transmission, the range of effective gear ratios may be divided into segments, and different mapping data may be provided for each segment.

The mapping data for each level of the state variable of the driveline system connected to the crankshaft 24 is not limited to the mapping data for each shift position Sft. For example, instead of using a state variable of the driveline system described in "Regarding State Variable of Driveline System as Mapping Input" as an input to the mapping, different mapping data may be provided for each level of the state variable. Nevertheless, it is not necessary to exclude this state variable from the inputs to the mapping when different mapping data is provided for each level of the state variable.

Regarding Mapping Data for Each Level of Road Surface State Variable

The mapping data for each level of the road surface state variable is not limited to the example shown in FIG. 14. For example, instead of using a road surface state variable SR described in "Regarding Road Surface State Variable as Mapping Input" as an input to the map, a different mapping may be provided for each level of the state variable SR. Nevertheless, it is not necessary to exclude this road surface state variable SR from the inputs to the mapping when a different mapping is provided for each level of the state variable SR.

Regarding Plurality of Types of Mapping Data

The plurality of types of mapping data is not limited to those provided for respective levels of the state variable of the internal combustion engine 10 as a result of control, respective control modes, respective levels of the state variable of the driveline system, or respective levels of the road surface state variable. For example, instead of using the moderator variable described in "Regarding Moderator Variable for Controlling Combustion Speed of Air-fuel Mixture as Mapping Input" as an input to the mapping, different mapping data may be provided for each level of the moderator variable. Nevertheless, it is not necessary to exclude this moderator variable, such as the air-fuel ratio, from the inputs to the mapping when different mapping data is provided for each level of the moderator variable. Further, instead of inputting the parameter relating to the environment in which the internal combustion engine is placed described in "Regarding Mapping Inputs" to the mapping, different mapping data may be provided for each level of the parameter relating to the environment. Nevertheless, it is not necessary to exclude this parameter relating to the environment from the inputs to the mapping when different mapping data is provided for each level of the parameter.

Further, the plurality of types of mapping data may be combinations of different types of mapping data described above. That is, mapping data for each shift position Sft may be further divided into mapping data for each level of rotational speed NE.

In addition, different mappings may be provided for different cylinders to output misfire probabilities P, and a common mapping may be used for two or more but not all cylinders.

Regarding Mapping Data Sets for Respective Misfire Types Classified According to Interval Between Cylinders with Misfires The process shown in FIG. 15 uses a mapping that determines probabilities that misfires have occurred in two cylinders in one combustion cycle. However, this may be further divided. For example, a different mapping data set may be provided for each interval between compression top dead center positions of two misfiring cylinders. In this case, a common mapping is used to output probabilities that misfires have occurred in the pair of cylinder #1 and cylinder #3, the pair of cylinder #3 and cylinder #4, the pair of cylinder #4 and cylinder #2, or the pair of cylinder #2 and cylinder #1.

As for misfires occurring in a plurality of cylinders, different mapping data may be provided for each of a situation where misfires occur continually in specific two cylinders, and a situation where misfires occur in different pairs of cylinders in one combustion cycle.

Regarding Torque Output Mapping

The embodiment described above uses the torque reduction ratio Trq as the data on generated torque, but the present disclosure is not limited to this. For example, the ratio to the maximum torque may be used. Further, the data on generated torque does have to be normalized so that the sum is 1, and may be an actual torque value.

The mapping that includes the torque output mapping and outputs probabilities by taking minute rotation durations T30 and other data as inputs is not limited to that shown in FIG. 7. The mapping may take as inputs the input variables shown in FIG. 6 or the input variables of the modifications described above. In addition, the torque output mapping may be included in a mapping other than the one used to output probabilities of misfires in respective cylinders assuming that misfires occur in one cylinder in one combustion cycle. For example, the mapping may be used to determine probabilities that misfires have occurred in two cylinders in one combustion cycle as shown in FIG. 15, or may be used to determine probabilities as the modifications in "Regarding Mapping Data Sets for Respective Misfire Types Classified according to Interval between Cylinders with Misfires." Further, the mapping does not have to be defined by a single type of mapping data for misfire detection. Each of different types of mappings described in the embodiments shown in FIGS. 11 to 14 and their modifications may include the torque output mapping.

Regarding Probability Mapping

In the process of FIG. 7, the intake air amount Ga, coolant temperature THW, and data on generated torque are used as inputs. However, the present disclosure is not limited to this, and only one of the two parameters of intake air amount Ga and coolant temperature THW may be used as an input. For example, instead of the intake air amount Ga, the rotational speed NE and charging efficiency η may be used as inputs.

Instead of performing computation using map data as described above, the computation using map data may output the value of output variable that corresponds to the value of input variable in the map data that is closest to the input value. When the map data contains three or more values for an output variable, the mapping outputs a discrete variable that can take three or more values according to the likelihood of misfires.

The probability mapping does not have to be defined by the map data and may be a function that outputs continuous variables.

Figure 10:
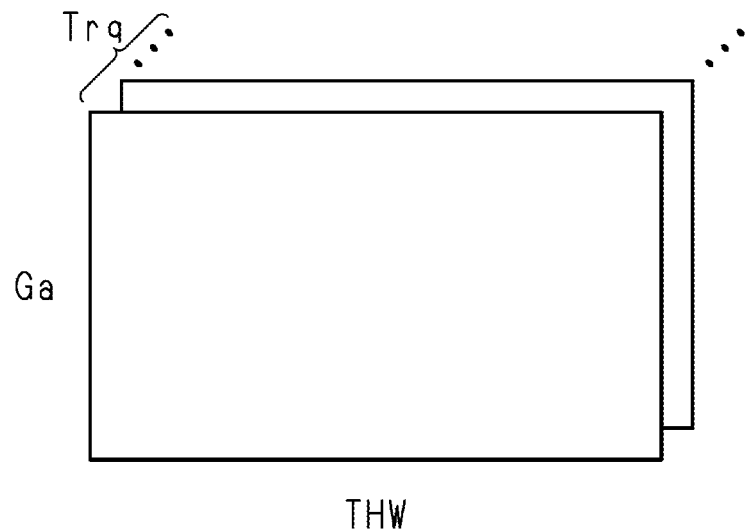
FIG. 10 is a diagram showing map data defining the correlation between torque reduction ratios and misfire probabilities according to the third embodiment.

The probability mapping does not have to directly take the outputs of the torque output mapping (the torque reduction ratios) as inputs, as shown in FIG. 10. For example, instead of inputting the moderator variables described in "Regarding Moderator Variable for Controlling Combustion Speed of Air-fuel Mixture as Mapping Input" to the linear mapping defined by input-side coefficients wFjk, these moderator variables may be used as parameters to calculate a correction amount for correcting the data on generated torque, such as the torque reduction ratios given by the torque output mapping. The values corrected using this correction amount may be input to the probability mapping.

Regarding Clarification of Mapping Structure

In the structure shown in FIG. 8, input-side coefficients wF12, wF13, . . . , wF16, wF18, . . . are not specifically described, but they may be set to 0. That is, in the linear mapping defined by the input-side coefficients wFlk, which is a mapping that passes the input variables to the unit in the intermediate layer to which T30(1)-T30(7) is output, all coefficients other than for the input variables x(1) and x(7) may be set to 0. In this case, the activation function h(x) that takes the output of the linear mapping defined by the input-side coefficients wFlk in the intermediate layer may be an identity mapping, so that nonlinearity is eliminated. The same configuration is preferably applied also to the coefficients that defines the mappings that pass T30(7)-T30(13), T30(13)-T30(19), and T30(19)-T30(1) to respective elements in the intermediate layer, and the corresponding activation functions h(x) in the intermediate layer.

The method for clarifying the mapping configuration is not limited to the third embodiment described with reference to FIGS. 7 to 10. For example, in the calculation of the torque reduction ratio Trq of one cylinder, the constraints that-side coefficients must have the same absolute value and opposite signs may be imposed on more than one pair of coefficients. That is, the constraints may be imposed on the input-side coefficients wF12 and wF18 so that they have the same absolute value and opposite signs. Consequently, the torque reduction ratio Trq(1) reflects the amount including T30(2)-T30(8) in addition to T30(1)-T30(7). The constraints that-side coefficients must have the same absolute value and opposite signs may be imposed on coefficients corresponding to minute rotation durations T30 obtained for second intervals that are separated from each other by a distance other than the interval between compression top dead center positions.

Further, it is not necessary to impose the constraints shown in FIG. 8 on the input-side coefficients wFjk and the output-side coefficients wSij of the neural network that outputs torque reduction ratios Trq. Furthermore, the outputs of the neural network that includes the constraints shown in the embodiment in FIG. 8 and its modifications do not have to be torque reduction ratios, and the outputs may be probabilities or original probabilities y of misfires.

Regarding Mapping

The activation functions h(x) in the intermediate layer do not have to be identical in all dimensions, as described in "Regarding Clarification of Mapping Configuration."

The neural network in the mapping that outputs probabilities of misfires and the generated torque is not limited to a neural network having one intermediate layer. For example, the mapping may include a neural network having two or more intermediate layers. When a greater number of intermediate layers are present, the use of the system illustrated in FIG. 16 is particularly effective in reducing the computation load on the controller 70.

The activation functions h(x) do not have to be hyperbolic tangent. For example, the logistic sigmoid function may be used. The activation functions f(x) in the processes of FIGS. 2, 6, 15 and 17 do not have to be hyperbolic tangent. For example, the logistic sigmoid function may be used. In this case, the outputs of the activation functions f(x) may be used as probabilities P without using the softmax function, so that the probabilities P(1) to P(4) that misfires have occurred in respective cylinders #1 to #4 are independent of one another and take values of 0 to 1.

The mapping that outputs the generated torque and misfire probabilities does not have to use a neural network. For example, the principal component analysis may be performed on the data obtained to be used as inputs to the mapping, such as minute rotation durations T30, so as to reduce the dimensions of the data. Instead of the input-side coefficients wFij described above, coefficients that define the reduced number of parameters may be used. This may be achieved by a modification of the first embodiment that uses the following neural network to obtain principal components. This neural network is an auto associative mapping that includes a compression mapping and an output mapping, which are linear mappings. The compression mapping takes, as inputs, parameters of 26 dimensions, which include 24 minute rotation durations T30, rotational speed NE, and charging efficiency η, and outputs parameters of n dimensions (n<26). The output mapping takes, as inputs, the outputs of the compression mapping and outputs parameters of 26 dimensions. To learn the components of the compression mapping such that the error between the inputs and outputs of the neural network is minimized, the compression mapping projects the input parameters into the n-dimensional space spanned by the first n principal components obtained in the principal component analysis. The coefficients of the compression mapping are used in place of the input-side coefficients wFjk (k≥1) described above to substitute for the linear combination of input parameters in the first embodiment. The n principal components are input to activation functions h(x), and the outputs of the activation functions h(x) are linearly combined using output-side coefficients wSij and input to activation functions f(x). The activation functions f(x) output generated torque or original probabilities y(i). This regression formula thus allows for determination of the presence or absence of misfires.

This modification does not include the input-side coefficients wFj0 serving as bias parameters. However, bias parameters may be added. In this case, it is desirable that the input-side coefficients wFj0 as bias parameters be learned by the same method as in the first embodiment.

Further, instead of inputting the physical amounts described above to the neural network, principal components obtained from the physical amounts may be used as inputs. Since the principal components includes the linear combination of the minute rotation durations T30(1) to T30(24), this method may be considered to be equivalent to a method in which the neural network takes, as inputs, the outputs of linear mappings that take the minute rotation durations T30(1) to T30(24) as inputs.

Further, the mapping may be a mapping that does not take, as inputs, the linear combination of the variables obtained in steps S10 and S12, for example. This may be achieved by a support vector machine. For example, the mapping may be w1·φ1 (T30(1), T30(2), . . . )+W2·φ2 (T30(1), T30(2), . . . )+ . . . using appropriate basis functions φi (i=1, 2, 3, . . . ) with multiple independent variables and coefficients w1, w2, . . . defined by the support vectors. That is, the coefficients w1, w2, . . . may be learned such that the sign of the output of the above formula is reversed depending on whether misfires have occurred. When the basis functions φ1, φ2, . . . include a function that does not take the linear combination of the input parameters as input, this mapping is an example of a mapping that does not take the linear combination of input parameters as input. The formula described above may be defined such that the misfire probability is 0 if the sign of the output value is positive, and the misfire probability is 1 if the output value is 0 or negative. The mapping thus outputs probabilities.

Regarding Mapping Output

As with the mapping that outputs a variable that can take three or more discrete values, as described in "Regarding Probability Mapping," the mapping including a neural network does not have to output probabilities P that are continuous variable. That is, the output may take on any discrete or continuous three or more values, such as three values corresponding to levels of likelihood that misfires have actually occurred. However, the present disclosure is not limited to this, and a binary variable may be output.

Regarding Determination Process

The determination process does not have to directly use the outputs of the mapping that outputs misfire probabilities. For example, the rotational speed NE may be excluded from the inputs to the mapping in the process of FIG. 2, and the outputs of misfire probabilities may be corrected using the rotational speed NE. Specifically, mapping data may be generated using training data obtained for a specific rotational speed NE, and when the actual rotational speed NE deviates from this specific rotational speed NE, the outputs of misfire probabilities given by the mapping may be increased. This method provides a safety margin in consideration of the reduced accuracy that results when the rotational speed NE deviates from the value on which the training data is generated.

Such a method is not limited to the correction using the rotational speed NE. For example, instead of inputting a moderator variable described in "Regarding Moderator Variable for Controlling Combustion Speed of Air-fuel Mixture as Mapping Input" to the mapping in addition to the instantaneous speed parameters, the moderator variable may be used as a parameter for calculating the correction amount used to correct the probabilities given by the mapping. Instead of inputting the state variable of the driveline system described in "Regarding State Variable of Driveline System as Mapping Input" to the mapping in addition to the instantaneous speed parameters, this state variable may be used as a parameter for calculating the correction amount used to correct the probabilities given by the mapping. Instead of inputting the road surface state variable described in "Regarding Road Surface State Variable as Mapping Input" to the mapping in addition to the instantaneous speed parameters, this state variable may be used as a parameter for calculating the correction amount used to correct the probabilities given by the mapping. Instead of inputting parameters described in "Regarding Mapping Inputs" and "Regarding Parameters Defining Operating Point of Internal Combustion Engine" to the mapping in addition to the instantaneous speed parameters, these parameters may be used as parameters for calculating the correction amount used to correct the probabilities given by the mapping.

Regarding Notification Process

As the notification process, the above-described embodiment operates the warning light 90 when the misfire problem is not resolved by any of steps S32, S36, and S40 performed after the fail flag F becomes 1. However, the present disclosure is not limited to this. For example, the notification process may be performed immediately when the fail flag F becomes 1.

The embodiment described above operates the warning light 90 and thereby notifies that misfires have occurred through visual information. However, the present disclosure is not limited to this. For example, the process may operate a speaker and thereby notify that misfires have occurred through audio information.

Regarding Operation Process

The embodiment described above performs step S36 if step S32 performed after the fail flag F becomes 1 fails to resolve misfires, and performs step S40 if step S36 fails to resolve misfires. However, the present disclosure is not limited to performing steps S32, S36, and S40 in this order to resolve misfires. For example, the process may be performed in the order of S36, S40, and S32, the order of S40, S36, S32, or the order of S40, S32, and S36.

The fail-safe process that is performed when the fail flag F becomes 1 is not limited to steps S32, S36, S40, and S44. For example, only one, two, or three of the four steps S32, S36, S40, and S44 may be performed.

Further, when the internal combustion engine is a compression ignition internal combustion engine, as will be described in "Regarding Internal Combustion Engine" below, the injection timing, instead of the ignition timing (step S36), may be advanced.

Regarding Mapping Data Generation

As the training data, the embodiment described above uses the data obtained while the internal combustion engine 10 is operated with the crankshaft 24 connected to the dynamometer 100 through the torque converter 60 and the transmission 64. However, the present disclosure is not limited to this. For example, the training data may be obtained while the internal combustion engine 10 operates in the vehicle VC.

Regarding Misfire Detection System

For example, the probabilities P(1) to P(4) calculated at step S16 in the center 120 may be sent to the vehicle VC, and steps S18 to S28 may be performed in the vehicle VC based on the probabilities P(1) to P(4).

The misfire detection system is not limited to a system that includes the controller 70 in the vehicle VC and the center 120 outside the vehicle VC. For example, in addition to the controller 70, a portable terminal of the user may be included as a recipient of the misfire determination result sent from the center 120. In this case, the notification process, which may be step S46 in FIG. 3, is performed by the mobile terminal, and the controller 70 may perform the fail-safe process, which may be steps of S32, S36, S40, and S44. This may be achieved by installing in the mobile terminal an application program that receives a signal from the center 120 and displays the determination result.

The process in section (b) in FIG. 17 may be performed by a portable terminal of the user of the vehicle VC, instead of by the center 120, which analyzes big data. This may be achieved by installing in the mobile terminal an application program that causes the computer to perform the process of section (b) in FIG. 17.

Regarding Execution Device

The execution device is not limited to a device that includes the CPU 72 (122) and the ROM 74 (124) and executes software processing. For example, at least part of the processes executed by the software in the above-illustrated embodiments may be executed by hardware circuits dedicated to executing these processes (such as ASIC). That is, the execution device may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Software executing devices each including a processor and a program storage device and dedicated hardware circuits may be provided.

Regarding Storage Device

In the embodiment described above, the storage device storing the mapping data 76*a*, 126*a* is separate from the storage device storing the misfire detection program 74*a* or the misfire detection main program 124*a* (ROM 74, 124). However, the present disclosure is not limited to this.

Regarding Internal Combustion Engine

The fuel injection valves used in the embodiment described above are direct injection valves, which inject fuel in the combustion chambers 18. However, the present disclosure is not limited to this. For example, port injection valves that inject fuel into the intake passage 12 may be used. Further, the internal combustion engine may include both port injection valves and direct injection valves.

The internal combustion engine is not limited to a spark ignition internal combustion engine, and may be a compression ignition internal combustion engine, which uses light oil as fuel, for example.

The internal combustion engine does not have to form the driveline system. For example, the internal combustion engine may be mounted on a series hybrid vehicle in which the crankshaft is mechanically coupled to an on-board electrical generator, and the force of the internal combustion engine is not transmitted to the drive wheels 69.

Regarding Vehicle

The vehicle is not limited to a vehicle in which the internal combustion engine is the only component that generates thrust for the vehicle. The vehicle may be a series hybrid vehicle described in "Regarding Internal Combustion Engine," a parallel hybrid vehicle, or a series-parallel hybrid vehicle.

Other Modification

The driveline system arranged between the crankshaft and the drive wheels is not limited to a stepped transmission, and may be a continuously variable transmission, for example.

Various changes in form and details may be made to the examples above without departing from the spirit and scope of the claims and their equivalents. The examples are for the sake of description only, and not for purposes of limitation.

Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire detection device for an internal combustion engine, comprising:
 memory circuitry; and
 processor circuitry, wherein
 the memory circuitry is configured to store mapping data that defines a mapping that takes rotation durations as inputs to output probabilities that a misfire has occurred in cylinders of the internal combustion engine, the mapping including a neural network having an intermediate layer, and a softmax function which normalizes outputs of the neural network so that a sum of the probabilities of misfires is equal to 1,
 the processor circuitry is configured to perform:
  an obtainment process that obtains the rotation durations based on a detection value of a sensor that detects rotational behavior of a crankshaft of the internal combustion engine;
  a determination process that determines presence or absence of a misfire based on an output of the mapping by inputting parameters correlated positively with the probabilities that a misfire has occurred into the softmax function to obtain the probabilities that a misfire has occurred, and comparing a maximum value of the probabilities that a misfire has occurred to a threshold value; and
  a response process that, when the determination process determines that a misfire has occurred, operates predetermined hardware to respond to a situation where the misfire has occurred,
 the mapping outputs a probability that a misfire has occurred in at least one cylinder, and the mapping data is data that has been learned by machine learning, and
 the parameters correlated positively with the probabilities that a misfire has occurred include the output of the neural network.

2. A misfire detection method for an internal combustion engine, comprising:
 by memory circuitry, storing mapping data that defines a mapping that takes rotation durations as inputs to output probabilities that a misfire has occurred in cylinders of the internal combustion engine, the mapping including a neural network having an intermediate layer, and a softmax function which normalizes outputs of the neural network so that a sum of the probabilities of misfires is equal to 1;
 by processor circuitry, obtaining the rotation durations based on a detection value of a sensor that detects rotational behavior of a crankshaft of the internal combustion engine;
 by the processor circuitry, determining presence or absence of a misfire based on an output of the mapping by inputting parameters correlated positively with the probabilities that a misfire has occurred into the softmax function to obtain the probabilities that a misfire has occurred, and comparing a maximum value of the probabilities that a misfire has occurred to a threshold value;
 by the processor circuitry, when determining that a misfire has occurred, operating predetermined hardware to respond to a situation where the misfire has occurred; and,
 by the processor circuitry, from the mapping, outputting a probability that a misfire has occurred in at least one cylinder, and the mapping data is data that has been learned by machine learning,
 wherein the parameters correlated positively with the probabilities that a misfire has occurred include the output of the neural network.

3. A non-transitory computer-readable storage medium that stores a program causing memory circuitry and processor circuitry to execute a misfire detection process for an internal combustion engine, wherein the misfire detection process, comprising:
 by the memory circuitry, storing mapping data that defines a mapping that takes rotation durations as inputs to output probabilities that a misfire has occurred in cylinders of the internal combustion engine, the mapping including a neural network having an intermediate layer, and a softmax function which normalizes outputs of the neural network so that a sum of the probabilities of misfires is equal to 1;
 by the processor circuitry, obtaining the rotation durations based on a detection value of a sensor that detects rotational behavior of a crankshaft of the internal combustion engine;
 by the processor circuitry, determining presence or absence of a misfire based on an output of the mapping by inputting parameters correlated positively with the probabilities that a misfire has occurred into the softmax function to obtain the probabilities that a misfire has occurred, and comparing a maximum value of the probabilities that a misfire has occurred to a threshold value;
 by the processor circuitry, when determining that a misfire has occurred, operating predetermined hardware to respond to a situation where the misfire has occurred; and
 by the processor circuitry, from the mapping, outputting a probability that a misfire has occurred in at least one cylinder, and the mapping data is data that has been learned by machine learning,
 wherein the parameters correlated positively with the probabilities that a misfire has occurred include the output of the neural network.

* * * * *